(12) United States Patent
Kawasaki et al.

(10) Patent No.: US 8,523,096 B2
(45) Date of Patent: Sep. 3, 2013

(54) DUAL-BEARING REEL

(75) Inventors: Kenichi Kawasaki, Osaka (JP); Shouji Nakagawa, Osaka (JP)

(73) Assignee: Shimano Inc., Osaka (JP)

( * ) Notice: Subject to any disclaimer, the term of this patent is extended or adjusted under 35 U.S.C. 154(b) by 223 days.

(21) Appl. No.: 13/220,296

(22) Filed: Aug. 29, 2011

(65) Prior Publication Data

US 2012/0056028 A1 Mar. 8, 2012

(30) Foreign Application Priority Data

Sep. 2, 2010 (JP) ................................. 2010-196826
Jan. 13, 2011 (JP) ................................. 2011-005203

(51) Int. Cl.
*A01K 89/01* (2006.01)
(52) U.S. Cl.
USPC ........... 242/257; 242/262; 242/267; 242/283; 242/301
(58) Field of Classification Search
USPC ................. 242/257, 262, 267, 282, 283, 300, 242/301
See application file for complete search history.

(56) References Cited

U.S. PATENT DOCUMENTS

| 6,464,158 | B1 * | 10/2002 | Sakurai | 242/283 |
| 6,598,817 | B2 * | 7/2003 | Kitajima et al. | 242/257 |
| 7,191,969 | B2 * | 3/2007 | Miyazaki et al. | 242/283 |
| 7,793,878 | B2 * | 9/2010 | Kobayashi | 242/259 |
| 2003/0218088 | A1 * | 11/2003 | Hirayama et al. | 242/283 |
| 2009/0166459 | A1 * | 7/2009 | Niitsuma et al. | 242/287 |

FOREIGN PATENT DOCUMENTS

JP H09-168354 A 6/1997

* cited by examiner

*Primary Examiner* — Emmanuel M Marcelo
(74) *Attorney, Agent, or Firm* — Global IP Counselors, LLP

(57) ABSTRACT

A dual-bearing reel includes a reel unit, a handle shaft, a one-way clutch, a drag mechanism, a drag regulation member, a handle, a spool, and a rotation transmission mechanism. The one-way clutch including an outer race being attached to the reel unit, where the outer race being not rotatable to the reel unit, an inner race unitarily and rotatably coupled to the handle shaft, and rollers disposed between the outer race and the inner race. The drag mechanism includes a drag washer unitarily and rotatably coupled to the handle shaft. The handle disposed between the drag regulation member and the reel unit, and includes a through hole. The handle shaft penetrates in the through hole, and is unitarily and rotatably coupled to the inner race around the through hole. The spool is rotatably attached to the reel unit.

18 Claims, 15 Drawing Sheets

DUAL-BEARING REEL

CROSS-REFERENCE TO RELATED APPLICATIONS

This application claims priority to Japanese Patent Application Nos. 2010-196826 filed on Sep. 2, 2010 and 2011-005203 filed on Jan. 13, 2011, the entireties of which are hereby incorporated by reference in their entireties.

BACKGROUND

1. Field of the Invention

The present invention relates to a fishing reel, and particularly to a dual-bearing reel configured to reel out a fishing line in conjunction with rotation of a spool winding the fishing line thereon.

2. Background Art

For example, Japan Laid-open Patent Application publication No. JP-A-H09-168354 describes an exemplary well-known dual-bearing reel including a roller-type one-way clutch configured to prevent rotation of a handle shaft in a fishing-line releasing direction for activating a drag mechanism. Such a well-known dual-bearing reel includes a reel unit, a handle shaft, and a drag mechanism. The handle shaft is rotatably attached to the reel unit. The drag mechanism includes a drag washer coupled to the handle shaft in a unitarily rotatable state. The one-way clutch is rotatably attached onto the outer peripheral surface of the handle shaft. Further, the one-way clutch includes an inner race. The inner race is coupled to the handle shaft through the drag washer while in a unitarily rotatable state. The handle shaft is rotated in response to an operation of a handle coupled to the tip of the handle shaft in a unitarily rotatable state. Drag force of the drag mechanism is regulated by a star drag including a nut member screwed onto the handle shaft. The drag washer is pressed towards the nut member of the star drag through the inner race. Drag force of the drag mechanism is thus appropriately set in accordance with the pressure.

The handle shaft includes a rotational coupling portion including two parallel surfaces on the outer peripheral surface thereof. On the other hand, the drag washer includes a first coupling portion and a second coupling portion in the center thereof. The first coupling portion is a non-circular portion to be engaged with the rotational coupling portion, whereas the second coupling portion is engaged with the inner race. The inner race includes a pair of engaging protrusions on one of the distal ends thereof. The engaging protrusions are axially extended and coupled to the second coupling portion. The second coupling portion includes a pair of engaged recesses. The engaged recesses are formed between the parallel parts (to be engaged with the rotational coupling portion) of the first coupling portion. The engaged recesses are engaged with the engaging protrusions.

SUMMARY

In the aforementioned well-known structure, rotation of the handle is transmitted to the inner race of the one-way clutch through the handle shaft and the drag washer. A slight clearance exists between the handle shaft and the engaged portion of the drag washer. Likewise, a slight clearance exists between the drag washer and the engaging portion of the inner race of the one-way clutch. The clearances are indispensible for assembling and disassembling the aforementioned components. Due to the clearances, the handle is allowed to be slightly rotated in the fishing-line releasing direction as well as in the fishing-line winding direction. Therefore, the handle may wobble when being operated for moving a terminal tackle by rotating and stopping rotating the spool in the fishing-line winding direction under a low drag force.

The present invention addresses a need to produce a dual-bearing reel for inhibiting handle wobbling.

A dual-bearing reel includes a reel unit, a handle shaft, a one-way clutch, a drag mechanism, a drag regulation member, a handle, a pool, and a rotation transmission mechanism. The handle shaft is rotatably supported by the reel unit. The one-way clutch includes an outer race being attached to the reel unit, where the outer race is not rotatable to the reel unit, an inner race unitarily and rotatably coupled to the handle shaft, and rollers disposed between the outer race and the inner race. The drag mechanism includes a drag washer unitarily and rotatably coupled to the handle shaft. The drag regulation member is attached to the handle shaft to regulate drag force of the drag mechanism. The handle is disposed between the drag regulation member and the reel unit. The handle includes a through hole. The handle shaft penetrates in the through hole. The handle is unitarily and rotatably coupled to the inner race around the through hole. The spool is rotatably attached to the reel unit. The rotation transmission mechanism is configured to transmit rotation of the handle to the spool

BRIEF DESCRIPTION OF THE DRAWINGS

Referring now to the attached drawings which form a part of this original disclosure.

DETAILED DESCRIPTION OF THE EMBODIMENTS

First Exemplary Embodiment

General Reel Configuration

Figure 1:
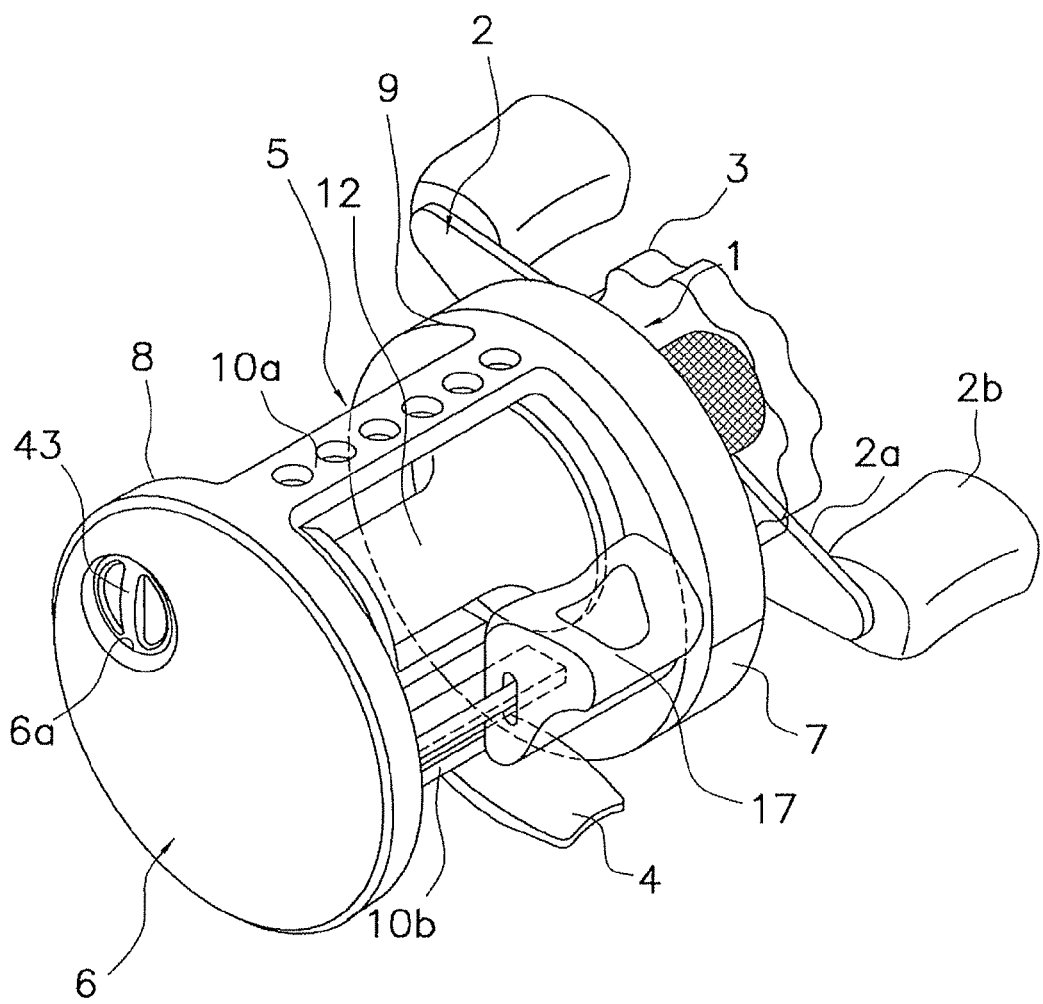
FIG. 1 is a perspective view of a dual-bearing reel according to a first exemplary embodiment of the present invention.
Figure 2:
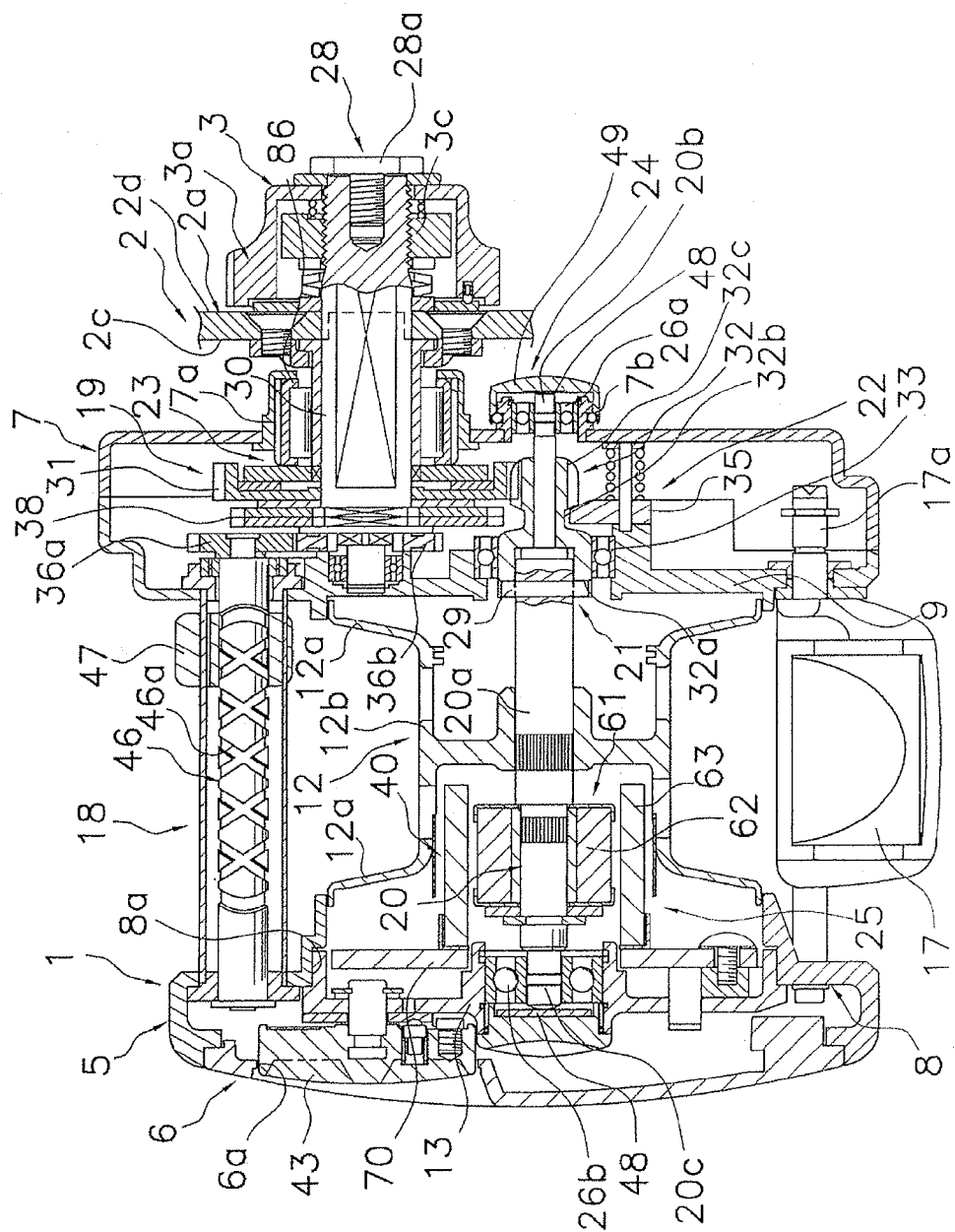
FIG. 2 is a horizontal cross-sectional view of the dual-bearing reel.

As illustrated in FIGS. 1 and 2, a dual-bearing reel of a first exemplary embodiment of the present invention is a round dual-bearing reel for bait casting. The dual-bearing reel includes a reel unit 1, a handle 2, a star drag 3 and a spool 12. The handle 2 is disposed lateral to the reel unit 1 for rotating the spool 12. The star drag 3 is a drag regulation member disposed on the opposite side of the reel unit 1 through the handle 2. The spool 12 is rotatably supported by the reel unit 1.

Handle Structure

The handle 2 is of a double-handle type including a plate-shaped handle arm 2a and knobs 2b rotatably attached to the both longitudinal ends of the handle arm 2a. As illustrated in FIG. 2, the handle arm 2a is disposed on the outer peripheral side of a handle shaft 30 while being disposed closer to the reel unit 1. The handle shaft 30 is herein rotatably attached to the reel unit 1.

Figure 4:
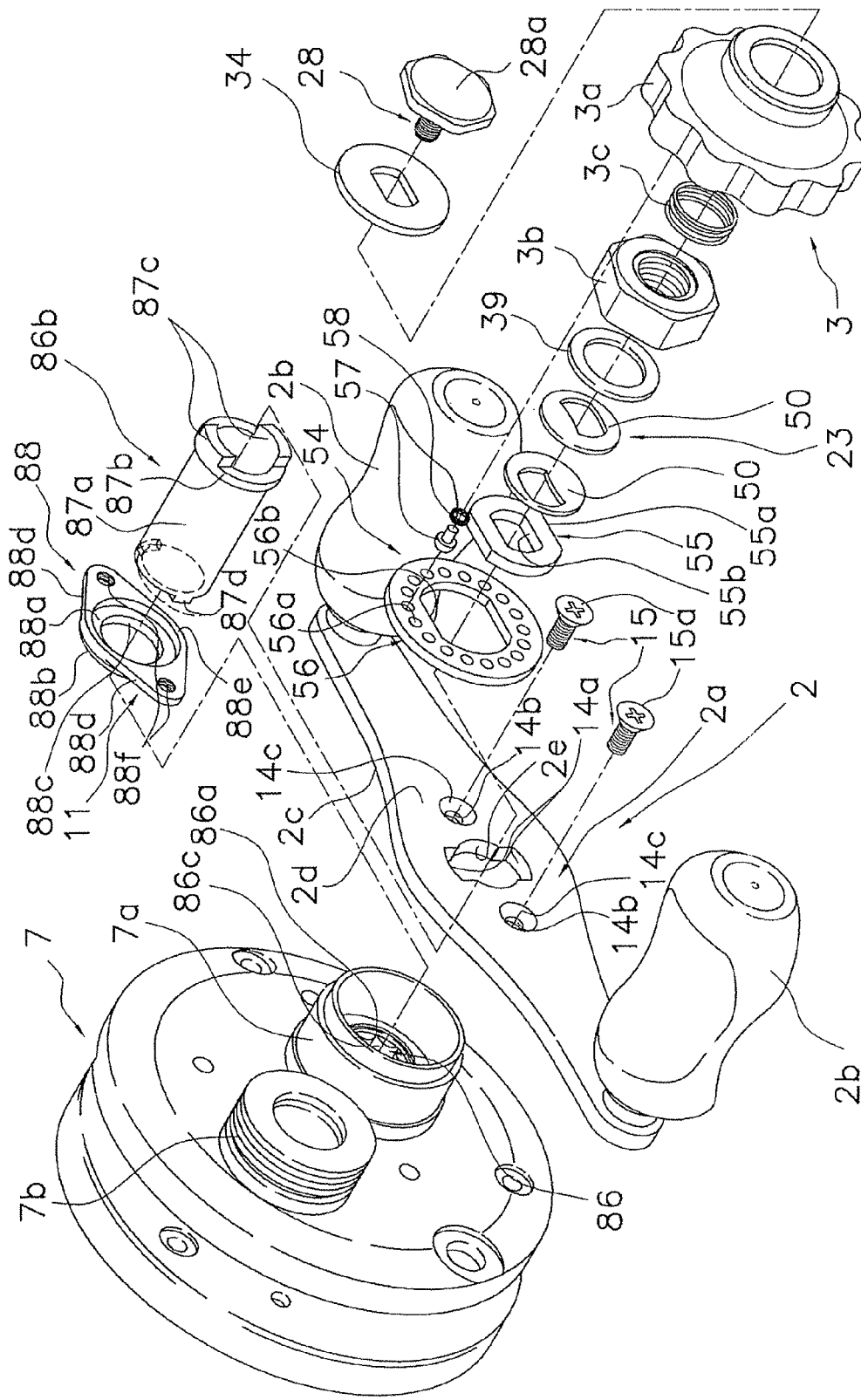
FIG. 4 is an exploded perspective view of the drag mechanism on a handle side.

The handle arm 2a is made of, for instance, light alloy (either aluminum alloy or magnesium alloy). In the first exemplary embodiment, the handle arm 2a is made of aluminum alloy. As illustrated in FIG. 2, the handle arm 2a is a roughly plate-shaped member including a first surface 2c, a second surface 2d, and a through hole 2e. The first surface 2c is herein disposed closer to the reel unit 1, whereas the second surface 2d is disposed away from the reel unit 1. As illustrated in FIG. 4, the handle arm 2a further includes a pair of first engaged recesses 14a and a pair of screw penetrating apertures 14b. The first engaged recesses 14a are outwardly recessed from the inner periphery of the through hole 2e.

The screw penetrating apertures 14b are positioned radial outwards of the through hole 2e. The through hole 2e is positioned in the longitudinal center of the handle arm 2a. The handle arm 2a is tapered from the longitudinal center thereof to the longitudinal ends thereof. Each first engaged recess 14a is recessed radial outwards from the inner peripheral surface of the through hole 2e in a direction perpendicular to the longitudinal direction of the handle arm 2a. The screw penetrating apertures 14b are aligned in the longitudinal direction of the handle arm 2a while interposing the through hole 2e therebetween. Each screw penetrating aperture 14b includes a head accommodating portion 14c on the second surface 2d. Each head accommodating portion 14c is recessed in a cone shape for accommodating a head portion 15a of a screw member 15 to be described. The knobs 2b are rotatably supported by the both tapered longitudinal ends of the handle arm 2a.

Reel Unit Structure

The reel unit 1 is a member made of metal such as aluminum alloy or magnesium alloy. In the first exemplary embodiment, the reel unit 1 is made of aluminum alloy. As illustrated in FIGS. 1 and 2, the reel unit 1 includes a frame 5, a first side cover 6, and a second side cover 7. The first and second side covers 6 and 7 are attached to the both lateral sides of the frame 5. The spool 12 for winding a fishing line is rotatably attached to the inside of the reel unit 1 through a spool shaft 20 (see FIG. 2). From the outside in the axial direction of the spool shaft 20, the first side cover 6 has a circular shape whereas the second side cover 7 has a shape formed by a pair of intersecting circles.

The first side cover 6 is attached to the frame 5 while being openable and closable. The first side cover 6 is supported by the frame 5 and pivotable after being axially separated outwards from the frame 5 when being openable and closable. The first side cover 6 is openable (or closale) in conjunction with detachment (or attachment) of a screw member (not illustrated in the figures) provided for the second side cover 7. The first side cover 6 includes a circular opening 6a for allowing a regulation knob 43 described below to be disposed therein.

The second side cover 7 is fixed to the frame 5 by screws. The second side cover 7 includes a first boss 7a for supporting the handle shaft 30 in a rotatable state. Further, the second side cover 7 includes a second boss 7b for supporting the spool shaft 20 in a rotatable state. The second boss 7b is disposed away from the first boss 7a at a predetermined distance.

As illustrated in FIG. 1, the frame 5 includes a first side plate 8, a second side plate 9, a top coupling portion 10a, and a pair of bottom coupling portions 10b. The first and second side plates 8 and 9 are configured opposite to each other at a predetermined distance. The first and second side plates 8 and 9 are integrally coupled by the top and bottom coupling portions 10a and 10b. The first side plate 8 includes a stepped circular opening 8a (see FIG. 2) positioned slightly higher than the center part thereof. A spool support portion 13, which forms a part of the reel unit 1, is screwed into the opening 8a. A brake mechanism 25 is disposed between the spool support portion 13 and the spool 12 for braking the spool 12 in casting.

As illustrated in FIG. 1, the top coupling portion 10a is disposed on a plane including the outer peripheries of the first and second side plates 8 and 9. The bottom coupling portions 10b are aligned back and forth while being disposed inwards of the outer peripheries of the first and second side plates 8 and 9. A fishing-rod attachment leg 4 is fixed to the bottom coupling portions 10b by rivets. The fishing-rod attachment leg 4 is a member elongated back and forth for attaching the reel onto the fishing rod. The fishing-rod attachment leg 4 is made of metal such as aluminum alloy.

As illustrated in FIG. 2, the frame 5 accommodates the spool 12, a clutch lever 17 and, a level winding mechanism 18. The clutch lever 17 functions as a thumb pad in thumbing the fishing line. The level winding mechanism 18 is configured to uniformly wind the fishing line onto the spool 12. As illustrated in FIG. 2, a rotation transmission mechanism 19, a clutch mechanism 21, a clutch control mechanism 22, a drag mechanism 23 and, a casting control mechanism 24 are disposed in the space between the frame 5 and the second side cover 7.

The rotation transmission mechanism 19 is configured to transmit rotational force from the handle 2 to the spool 12 and the level winding mechanism 18. The clutch mechanism 21 is configured to couple/decouple the handle 2 and the spool 12. The clutch control mechanism 22 is configured to control and set the clutch mechanism 21 to be in either a clutch-on state (i.e., a coupled state) or a clutch-off state (i.e., a decoupled state) in response to an operation of the clutch lever 17. When the clutch mechanism 21 is set to be in the clutch-off state, the spool 12 is freely rotatable. The drag mechanism 23 is configured to brake rotation of the spool 12 in the fishing-line releasing direction. The casting control mechanism 24 is configured to regulate resistance produced in rotation of the spool 12.

Spool Structure

As illustrated in FIG. 2, the spool 12 includes a pair of flanges 12a and a bobbin trunk 12b. The flanges 12a are saucer-shaped portions formed on the both axial ends of the spool 12. The bobbin trunk 12b is a tubular portion formed between the flanges 12a. The outer peripheral surface of the left flange 12a (see FIG. 2) is disposed away from the inner peripheral side of the opening 8a through a slight clearance for preventing the fishing line from being stuck. The spool 12 is non-rotatably fixed to the spool shaft 20 penetrating through the inner peripheral side of the bobbin trunk 12b by, for instance, serration coupling. The method of fixing the spool 12 to the spool shaft 20 is not herein limited to serration coupling. For example, a variety of coupling methods (e.g., key coupling or spline coupling) may be used for coupling the spool 12 to the spool shaft 20.

As illustrated in FIG. 2, the spool shaft 20 is disposed in parallel to the handle shaft 30. The spool shaft 20 is made of non-magnetic metal such as SUS304. The spool shaft 20 is extended outwards of the second side cover 7 while penetrating the second side plate 9. The extended end of the spool shaft 20 is rotatably supported by the second boss 7b through a first bearing 26a. The second boss 7b is attached to the second side cover 7 while protruding outwards. On the other hand, the other end of the spool shaft 20 is rotatably supported by a second bearing 26b. The spool shaft 20 includes a large-diameter portion 20a, a first small-diameter portion 20b, and a second small-diameter portion 20c. The large-diameter portion 20a is positioned in the axial center part of the spool shaft 20. The first and second small-diameter portions 20b and 20c are formed on the both axial ends of the spool shaft 20. The first small-diameter portion 20b is supported by the first bearing 26a, whereas the second small-diameter portion 20c is supported by the second bearing 26b.

Further, magnets 62 of the brake mechanism 25 are attached onto a portion of the spool shaft 20 positioned between the second small-diameter portion 20c (the left-side one in FIG. 2) and the large-diameter portion 20a. The portion of the spool shaft 20, which attaches the magnets 62 thereon, has an outer diameter greater than that of the second small-diameter portion 20c but less than that of the large-diameter portion 20a. The right end of the large-diameter portion 20a of the spool shaft 20 is disposed in a position where the spool shaft 20 penetrates the second side plate 9. An engaging pin 29, which forms a part of the clutch mechanism 21, is fixed to the right end of the large-diameter portion 20a. Specifically, the engaging pin 29 penetrates the large-diameter portion 20a along the diameter of the large-diameter portion 20a. The both ends of the engaging pin 29 are radially protruding from the large-diameter portion 20a.

Rotation Transmission Mechanism Structure

As illustrated in FIG. 2, the rotation transmission mechanism 19 includes the handle shaft 30, a drive gear 31, a pinion gear 32, a first gear member 36a (FIG. 2), and a second gear member 36b. The drive gear 31 is fixed onto the handle shaft 30. The pinion gear 32 is a tubular member to be meshed with the drive gear 31. The handle shaft 30 is rotatably attached to the second side plate 9 and the second side cover 7 through a bearing 16 and a one-way clutch 86, respectively.

The handle shaft 30 is prevented from rotating in the fishing-line releasing direction (i.e., prevented from reversely rotating) by the roller-type one-way clutch 86. The handle shaft 30 includes a rotational coupling portion 30a on the outer peripheral surface thereof. The rotational coupling portion 30a is coupled to a drag washer 51 to be described in a unitarily rotatable state. The rotational coupling portion 30a is formed by a pair of parallel flat surfaces formed on the outer peripheral surface of the handle shaft 30. The handle shaft 30 includes a male threaded portion 30b on the tip thereof. A nut portion 3b of the star drag 3 to be described is screwed onto the male threaded portion 30b. The handle shaft 30 includes a female threaded hole 30c in one of the distal end surfaces thereof. The female threaded hole 30c is formed in the center of the distal end surface of the handle shaft 30. The handle shaft 30 includes an engaging portion 30d with a small diameter on the outer peripheral surface of the distal end thereof. The engaging portion 30d has a shape roughly similar to but smaller than that of the rotational coupling portion 30a.

One-way Clutch Structure

Figure 3:
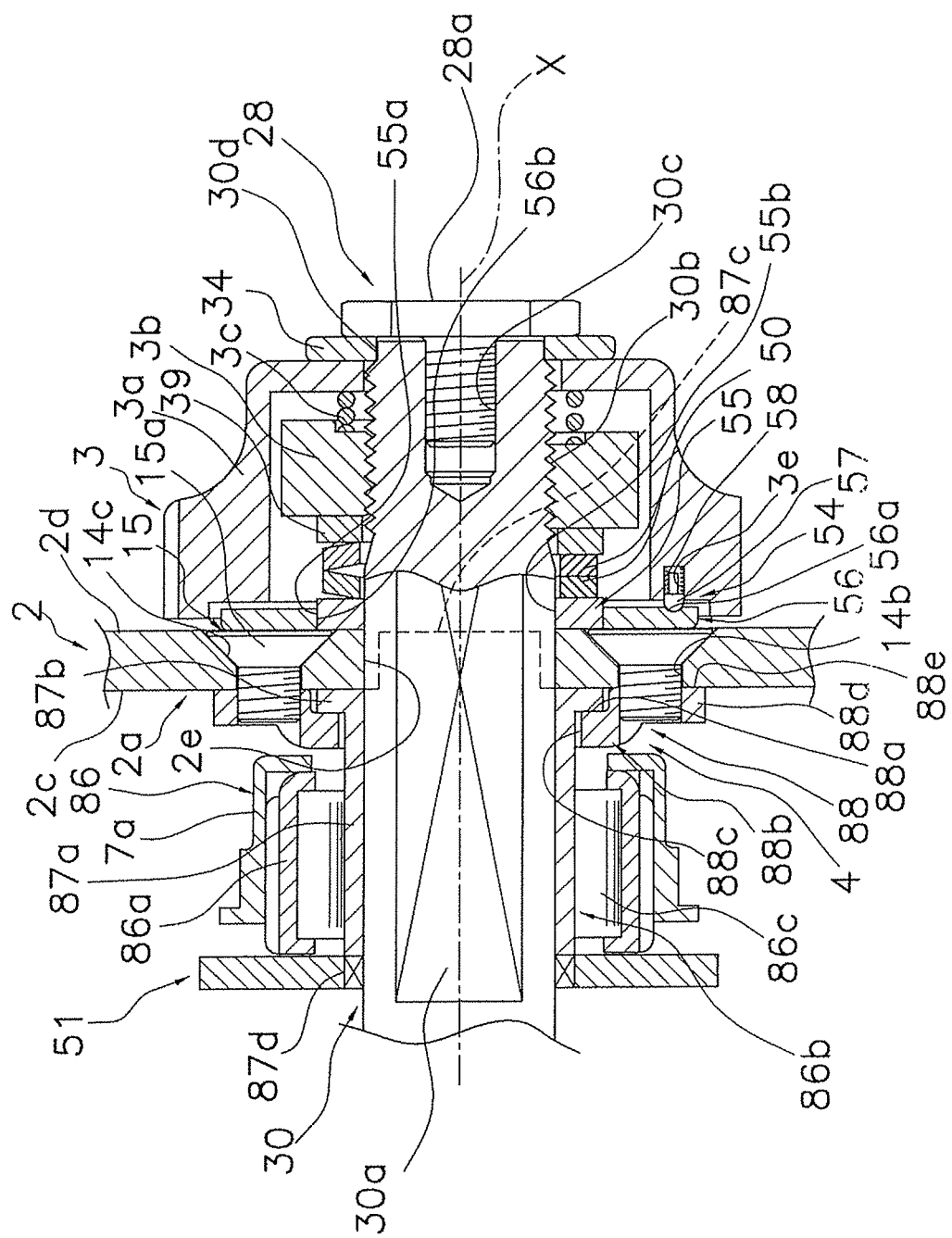
FIG. 3 is an enlarged cross-sectional view of a drag mechanism and its periphery of the dual-bearing reel illustrated in FIG. 2.

As illustrated in FIG. 3, the one-way clutch 86 is attached radially between the second side cover 7 and the handle shaft 30. The one-way clutch 86 includes an outer race 86a, an inner race 86b and a rocking element 86c. The outer race 86 is made of iron-based alloy including stainless alloy, such as SUS440C. The outer race 86a is attached onto the first boss 7a in a non-rotatable state. The first boss 7a is herein attached to the second side cover 7 while being protruding outwards.

The inner race 86b is made of iron-based alloy including stainless alloy, such as SUS 440C. The inner race 86b is rotatably attached onto the handle shaft 30. The rollers 86c are made of iron-based alloy including stainless alloy, such as SUS440C. The rollers 86c, forming a cylindrical roller unit, are disposed between the outer race 86a and the inner race 86b while being allowed to get stuck therebetween. Anticorrosive performance is enhanced for the surfaces of these members by reformation. It should be noted that the inner race may be attached onto the handle shaft 30 in a unitarily rotatable state. A retainer section 4 is disposed axially between the inner race 86b and the handle arm 2a for preventing the inner race 86b from being detached from the handle arm 2a. The retainer section 4 is fixed to the first surface 2c of the handle arm 2a. The retainer section 4 includes a restricting member 88 for restricting movement of the inner race 86b in the axial direction of the handle shaft 30.

Inner Race Structure

The inner race 86b is interposed between the handle 2 and the drag washer 51 to be described of the drag mechanism 23 while making contact with both of the handle 2 and the drag washer 51. The inner race 86b is prevented from being detached from the first surface 2c of the handle arm 2a by the restricting member 88. Accordingly, the inner race 86b is restricted from moving in the axial direction of the handle shaft 30. The inner race 86b includes a tubular portion 87a disposed on the outer peripheral side of the handle shaft 30, a retainer protrusion 87b, a pair of first engaging protrusions 87c, and a pair of second engaging protrusions 87d. The retainer protrusion 87b is annularly protruding from the outer peripheral surface of a first end (i.e., a right end in FIG. 3) of the tubular portion 87a. The end surface of the retainer protrusion 87b makes contact with the first surface 2c of the handle arm 2a.

The first engaging protrusions 87c are axially protruding towards the handle arm 2a from the axial end of the retainer protrusion 87b. The first engaging protrusions 87c are engaged with the first engaged recesses 14a of the handle arm 2a. Accordingly, the inner race 86b and the handle arm 2a are coupled in a unitarily rotatable state. The second engaging protrusions 87d are axially protruding towards the drag washer 51 from a second end (i.e., a left end in FIG. 3) of the tubular portion 87a. The second engaging protrusions 87d are engaged with the drag washer 51 in a unitarily rotatable state. In the first exemplary embodiment, the phase of the second engaging protrusions 87d is shifted from that of the first engaging protrusions 87c by an angle of 90 degrees. However, the phase of the second engaging protrusions 87d may be identical to that of the first engaging protrusions 87c. Alternatively, the phase of the second engaging protrusions 87d may be shifted from that of the first engaging protrusions 87c by any suitable angle excluding 90 degrees. As described below, the drag washer 51 is engaged with the handle shaft 30 in a unitarily rotatable state. Therefore, the inner race 86b is coupled to the handle shaft 30 through the drag washer 51 in a unitarily rotatable state. Further, the inner race 86b and the handle arm 2a are directly coupled in a unitarily rotatable state.

Restricting Member Structure

The restricting member 88 is made of, for instance, aluminum alloy. As illustrated in FIGS. 3 and 4, the restricting member 88 is fixed to the first surface 2c of the handle arm 2a by the screw members 15 for restricting movement of the inner race 86b in the axial direction of the handle shaft 30. The screw members 15 are herein inserted from the second surface 2d (i.e., the outer surface) of the handle arm 2a. The restricting member 88 includes a restricting portion 88b, a through hole 88c and a pair of fixed portions 88d. The restricting portion 88b includes a retainer surface 88a making contact with a surface of the retainer protrusion 87b, i.e., a surface opposite to the axially outward end surface of the retainer protrusion 87b. The through hole 88c allows the tubular portion 87a to pass therethrough. The fixed portions 88d are fixed to the handle arm 2a.

The restricting portion 88b includes an annular end surface 88e contactable with the first surface 2c of the handle arm 2a. The retainer surface 88a is annularly recessed on the inner peripheral side of the end surface 88e for accommodating the retainer protrusion 87b of the inner race 86b. The depth from the end surface 88e to the retainer surface 88a is equal to or slightly less than the thickness of the retainer protrusion 87b. The through hole 88c is formed in the inner peripheral surface of the restricting portion 88b. Each fixed portion 88d is longitudinally tapered along the outer periphery of the restricting portion 88b. Each fixed portion 88d includes a female threaded portion 88f that the screw member 15 is screwed. The female threaded portions 88f are configured to be opposite to the screw penetrating apertures 14b.

The drive gear 31 is rotatably attached onto the handle shaft 30 while being frictionally connected to the handle shaft 30 through the drag mechanism 23.

The pinion gear 32 is a tubular member that the spool shaft 20 penetrates through the center part thereof. The pinion gear 32 is inwardly extended from the outside of the second side plate 9. The pinion gear 32 is attached onto the spool shaft 20 while being axially movable. Further, the left end (see FIG. 2) of the pinion gear 32 is supported by the second side plate 9 through a bearing 33 while being rotatable and axially movable. The pinion gear 32 includes an engaged groove 32a on the left end thereof (see FIG. 2). The engaged groove 32a is engaged with the engaging pin 29. The engaged groove 32a and the engaging pin 29 form the clutch mechanism 21. Further, the pinion gear 32 includes a narrowed portion 32b in the axial intermediate part thereof. Yet further, the pinion gear 32 includes a gear portion 32c on the axial right end thereof. The gear portion 32c is meshed with the drive gear 31.

Drag Mechanism Structure

Figure 5:
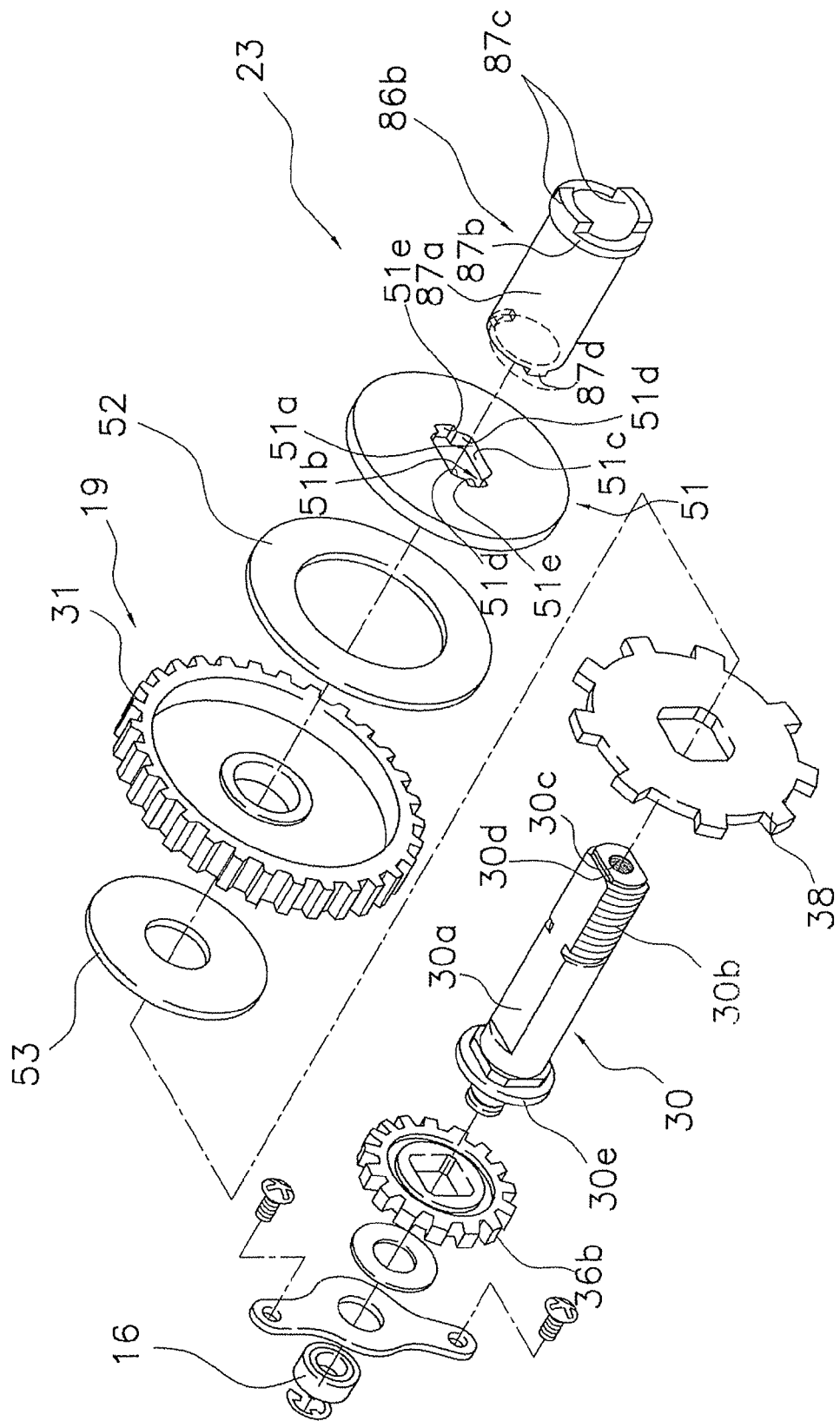
FIG. 5 is an exploded perspective view of the drag mechanism on a reel unit side.

As illustrated in FIGS. 3, 4 and 5, the drag mechanism 23 is configured to regulate drag force in response to an operating position of the star drag 3 attached onto the handle shaft 30. The drag mechanism 23 is allowed to regulate and brake rotation of the spool 12 in the fishing-line releasing direction.

The star drag 3 is attached onto the tip of the handle shaft 30 while interposing the handle 2 together with the inner race 86b. As illustrated in FIGS. 3 and 4, the star drag 3 includes an operating part body 3a and the nut portion 3b. The operating part body 3a includes convexo-concaves on the outer peripheral surface thereof. The nut portion 3b is attached to the operating part body 3a while being unitarily rotatable therewith and axially movable. As described above, the nut portion 3b is screwed onto the male threaded portion 30b. When the operating part body 3a is rotated, the nut portion 3b is movable in the axial direction of the handle shaft 30. A coil spring 3c is disposed in a compressed state between the nut portion 3b and the operating part body 3a. The coil spring 3c is an urging member for urging the operating part body 3a towards the distal end of the handle shaft 30. The operating part body 3a is prevented from being detached from the handle shaft 30 by a fixation bolt 28. The fixation bolt 28 is screwed into the female threaded hole 30c formed in the distal end surface of the handle shaft 30. The fixation bolt 28 includes a head 28a having an outer diameter greater than that of the distal end of the handle shaft 30. The fixation bolt 28 prevents the handle 2 from being detached from the handle shaft 30 through the star drag 3. A first washer member 34 is attached axially between the operating part body 3a and the fixation bolt 28. The first washer member 34 is attached onto the small-diameter engaging portion 30d formed on the distal end of the handle shaft 30 while being unitarily rotatable therewith. The operating part body 3a constantly makes contact with the first washer member 34 while being pressed by the coil spring 3c.

In addition to the nut portion 3b, a second washer member 39, a pair of disc springs 50 and a star drag sound producing mechanism 54 are disposed in the operating part body 3a. The second washer member 39 makes contact with the nut portion 3b. The disc springs 50 form a part of the drag mechanism 23. The second washer member 39 and the disc springs 50 are disposed in the inside of the operating part body 3a. The second washer member 39 is disposed for efficiently transmitting pressure of the nut portion 3b to the disc springs 50.

The star drag sound producing mechanism 54 is configured to produce sounds in accordance with a rotational operation of the star drag 3. The star drag sound producing mechanism 54 is disposed between the handle 2 and the star drag 3. Specifically, the star drag sound producing mechanism 54 is disposed between the disc springs 50 and the handle arm 2a. The star drag sound producing mechanism 54 includes a transmission washer 55, a sound producing member 56, and a hitting member 57. The transmission washer 55 is coupled to the rotational coupling portion 30a of the handle shaft 30 in a unitarily rotatable state. The transmission washer 55 is configured to transmit spring force of the disc springs 50 to the handle arm 2a while making contact with the disc spring 50. The transmission washer 55 includes a non-circular outer peripheral surface 55a and a non-circular inner peripheral surface 55b to be engaged with the engaging portion 30d.

The sound producing member 56 is attached to the outer peripheral surface 55a of the transmission washer 55. The sound producing member 56 is thus engaged with the transmission washer 55 in a unitarily rotatable state. Specifically, the sound producing member 56 is an annular plate-shaped member. The sound producing member 56 includes sound producing recesses 56a on a surface thereof disposed closer to the star drag 3. The sound producing recesses 56a are circumferentially aligned at predetermined intervals. The sound producing member 56 includes an engaging hole 56b in the inner peripheral surface thereof. The engaging hole 56b is a non-circular hole to be engaged with the non-circular outer peripheral surface 55a of the transmission washer 55.

The hitting member 57 is configured to repeatedly hit the sound producing recesses 56a of the sound producing member 56. The hitting member 57 is attached to an attachment recess 3e formed on an end surface of the operating part body 3a (i.e., the end surface closer to the handle 2) while being allowed to be protruding from and retracted to the attachment recess 3e. The hitting member 57 is urged towards the sound producing member 56 by a coil spring 58 accommodated in the attachment recess 3e.

The drag mechanism 23 is disposed about the handle shaft 30. As illustrated in FIGS. 3, 4 and 5, the drag mechanism 23 includes the aforementioned two disc springs 50, the drag washer 51, a first drag disc 52 and a second drag disc 53. The disc springs 50 are pressed by the nut portion 3b of the star drag 3. The first and second drag discs 52 and 53 are disposed while interposing the drive gear 31 therebetween. As described above, the disc springs 50 are disposed for minutely adjusting pressure by the nut portion 3b. Specifically, the disc springs 50 are disposed between the star drag 3 and the handle 2. The disc springs 50 are configured to transmit spring force varying in conjunction with the axial movement of the star drag 3 to the drag washer 51 through the handle 2 and the inner race 86b. The disc springs 50 are also disposed for preventing the handle arm 2a from wobbling when the star drag 3 is loosened for moving the operating part body 3a towards the distal end of the handle shaft 30. Therefore, each disc spring 50 is disposed in a more compressed state than in its free state even when the star drag 3 is operated for producing the weakest drag force (i.e., the most compressed state of the coil spring 3c) as illustrated in a part of FIG. 3 above a handle axis X. It should be noted that a part of FIG. 3 below the handle axis X illustrates the disc springs 50 and their periphery under the strongest drag force.

The drag washer 51 is coupled to the handle shaft 30 in a unitarily rotatable state. The drag washer 51 is coupled to the inner race 86b as well as the handle shaft 30 in a unitarily rotatable state. As illustrated in FIG. 5, the drag washer 51 includes a first coupling portion 51a and a second coupling portion 51b. The first coupling portion 51a is coupled to the handle shaft 30 in a unitarily rotatable state, whereas the second coupling portion 51b is coupled to the inner race 86b in a unitarily rotatable state. More specifically, the drag washer 51 includes the first coupling portion 51a in the inner periphery thereof. The first coupling portion 51a includes a pair of straight portions 51c and a pair of connecting portions 51d. The straight portions 51c are disposed in parallel to each other. One connecting portion 51d connects one ends of the straight portions 51c, whereas the other connection portion 51d connects the other ends of the straight portions 51c. The straight portions 51c are engaged with the surfaces of the rotational coupling portion 30a of the handle shaft 30 and rotation of the drag washer 51 is thereby transmitted to the handle shaft 30. The second coupling portion 51b includes a pair of second engaged recesses 51e recessed on the connecting portions 51d. The second engaging protrusions 87d of the inner race 86b are engaged with the second engaged recesses 51e, and rotation of the inner race 86b is thereby transmitted to the drag washer 51. Further, rotation of the drag washer 51 is transmitted to the handle shaft 30. The handle shaft 30 is thus rotated by rotation of the handle 2. In the well-known structure, rotation of the handle has been configured to be directly transmitted to the handle shaft. In the present exemplary embodiment, by contrast, rotation of the handle 2 is directly transmitted to the inner race 86b and is further transmitted to the handle shaft 30 through the inner race 86b and the drag washer 51. The inner race 86b is herein coupled to the handle shaft 30 through the drag washer 51 in a unitarily rotatable state.

The first drag disc 52 makes contact with the drive gear 31 and the drag washer 51 while being interposed therebetween. The second drag disc 53 makes contact with the drive gear 31 and a ratchet wheel 38 while being interposed therebetween. The first and second drag discs 52 and 53 are rotatable with respect to the handle shaft 30. The ratchet wheel 38 also functions as the drag mechanism 23. The ratchet wheel 38 is positioned to make contact with a large-diameter flanged portion 30e formed on the outer peripheral surface of the handle shaft 30. The ratchet wheel 38 receives pressure of the star drag 3 through the flanged portion 30e.

Other Structures

The clutch lever 17 is disposed on the rear part of the interposed space between the first side plate 8 and the second side plate 9. Simultaneously, the clutch lever 17 is disposed rearwards of the spool 12. The clutch lever 17 is configured to slide up and down between the first side plate 8 and the second side plate 9. The clutch lever 17 includes an engaging shaft 17a on the same side as the handle 2. The engaging shaft 17a is integrally formed with the clutch lever 17. The engaging shaft 17a penetrates through the second side plate 9. Further, the engaging shaft 17a is engaged with the clutch control mechanism 22.

As illustrated in FIG. 2, the level winding mechanism 18 is disposed forwards of the spool 12 while being disposed between the first side plate 8 and the second side plate 9. The level winding mechanism 18 includes a helical shaft 46 and a fishing-line guide portion 47. The helical shaft 46 includes intersecting helical grooves 46a on the outer peripheral surface thereof. The fishing-line guide portion 47 is configured to reciprocate along the axial direction of the spool shaft 20 in conjunction with rotation of the helical shaft 46 in order to guide the fishing line. The first gear member 36a, forming a part of the rotation transmission mechanism 19, is attached onto the right end of the helical shaft 46 (see FIG. 2). The first gear member 36a is meshed with the second gear member 36b attached onto the handle shaft 30 in a unitarily rotatable state. With the aforementioned structure, the helical shaft 46 is configured to be rotated in conjunction with rotation of the handle shaft 30 in the fishing line-winding direction. In conjunction with rotation of the helical shaft 46, the fishing-line guide portion 47 is configured to reciprocate along the axial direction of the spool shaft 20.

As illustrated in FIG. 2, the clutch control mechanism 22 includes a clutch yoke 35. The clutch yoke 35 is engaged with the narrowed portion 32b of the pinion gear 32 for moving the pinion gear 32 along the axial direction of the spool shaft 20. The clutch yoke 35 is configured to be moved in response to a slide position of the clutch lever 17 between a clutch-on position and a clutch-off position that is arranged outwards of the clutch-on position in the axial direction of the spool shaft 20.

As illustrated in FIG. 2, the casting control mechanism 24 includes a plurality of friction plates 48 and a brake cap 49. The friction plates 48 are abutted to the both axial ends of the spool shaft 20 from the axial outside of the spool shaft 20. The brake cap 49 is configured to regulate abutting pressure of the friction plates 48 against the spool shaft 20. The left-side friction plate 48 is attached within the spool support portion 13. The brake cap 49 is screwed onto the outer peripheral surface of the second boss 7b of the second side cover 7.

As illustrated in FIG. 2, the brake mechanism 25 includes a spool brake unit 40, a rotation speed sensor (not illustrated in the figures), the regulation knob 43 and a spool control unit (not illustrated in the figure). The spool brake unit 40 is mounted on both the spool 12 and the reel unit 1. The spool control unit 40 is a microcomputer configured to electrically control the spool brake unit 40 in response to an operational position of the regulation knob 43. The spool brake unit 40 is an electrically controllable unit configured to brake the spool 12 by power generation. The spool brake unit 40 includes a rotor 61, a plurality of (e.g., four) coils 63 and a switching element (not illustrated in the figures). The rotor 61 includes four magnets 62 aligned along the rotational direction of the spool shaft 20. The coils 63 are serially connected and configured opposite to each other on the outer peripheral side of the rotor 61. The switching element is connected to the both ends of the serially-connected coils 63. The rotation speed sensor is disposed for detecting the rotational speed of the spool 12 and computing tension based on the detected rotational speed. The spool control unit is embedded with a circuit board 70 fixed to the spool support portion 13. The regulation knob 43 is rotatably attached to the spool support portion 13.

Reel Actions in Actual Fishing

In fishing, the clutch lever 17 is firstly slid and set in the clutch off position for setting the clutch mechanism 21 in the clutch off state. The fishing rod is cast under the condition for releasing the fishing line from the spool 12. When a terminal tackle lands in water, the handle 2 is slightly rotated in the fishing-line winding direction. A clutch return mechanism (not illustrated in the figures) is accordingly activated and the clutch mechanism 21 is set in the clutch on state. The clutch lever 17 is also herein returned to the clutch on position.

Under the condition, an angler waits for a fish to be hooked by the terminal tackle. When a fish is hooked by the terminal tackle, the handle 2 is rotated in the fishing-line winding direction for pulling the hooked fish. When the handle 2 is rotated in the fishing-line winding direction, rotation of the handle 2 is transmitted to the inner race 86*b* and is further transmitted to the handle shaft 30 through the drag washer 51. When the handle shaft 30 is rotated, the drive gear 31 frictionally coupled to the handle shaft 30 is rotated by the drag mechanism 23. Rotation of the drive gear 31 is transmitted to the spool shaft 20 through the pinion gear 32 and the clutch mechanism 21. Accordingly, the spool 12 is rotated in the fishing-line winding direction.

In the well-known structure that rotation of the handle is directly transmitted to the handle shaft, the inner race is affected by looseness (i.e., clearance) between the handle shaft and the drag washer and looseness (i.e., clearance) between the drag washer and the inner race when the drag mechanism 23 is set to have a weak drag force in winding the fishing line. When an operation of moving a terminal tackle (e.g., jigging) by rotating and stopping rotating the handle in the fishing-line winding direction, the handle wobbles due to the structure that the handle is slightly rotatable by the clearance in the fishing-line releasing direction. In the present exemplary embodiment, by contrast, rotation of the handle 2 is directly transmitted to the inner race 86*b*. Therefore, a clearance is reduced between the handle 2 and the inner race 86*b*. This prevents the handle 2 from easily rotating in the fishing-line releasing direction. Consequently, the handle 2 is prevented from easily wobbling. Further, the inner race 86*b* is coupled to the handle arm 2*a* in a unitarily rotatable state while axial movement thereof is restricted by the restricting member 88 fixed to the first surface 2*c* of the handle arm 2*a*. Therefore, the inner race 86*b* can be reliably fixed to the handle 2.

Modification 1 of First Exemplary Embodiment

Only the difference from the first exemplary embodiment will be hereinafter explained without explaining the same components as those in the first exemplary embodiment.

Figure 6:
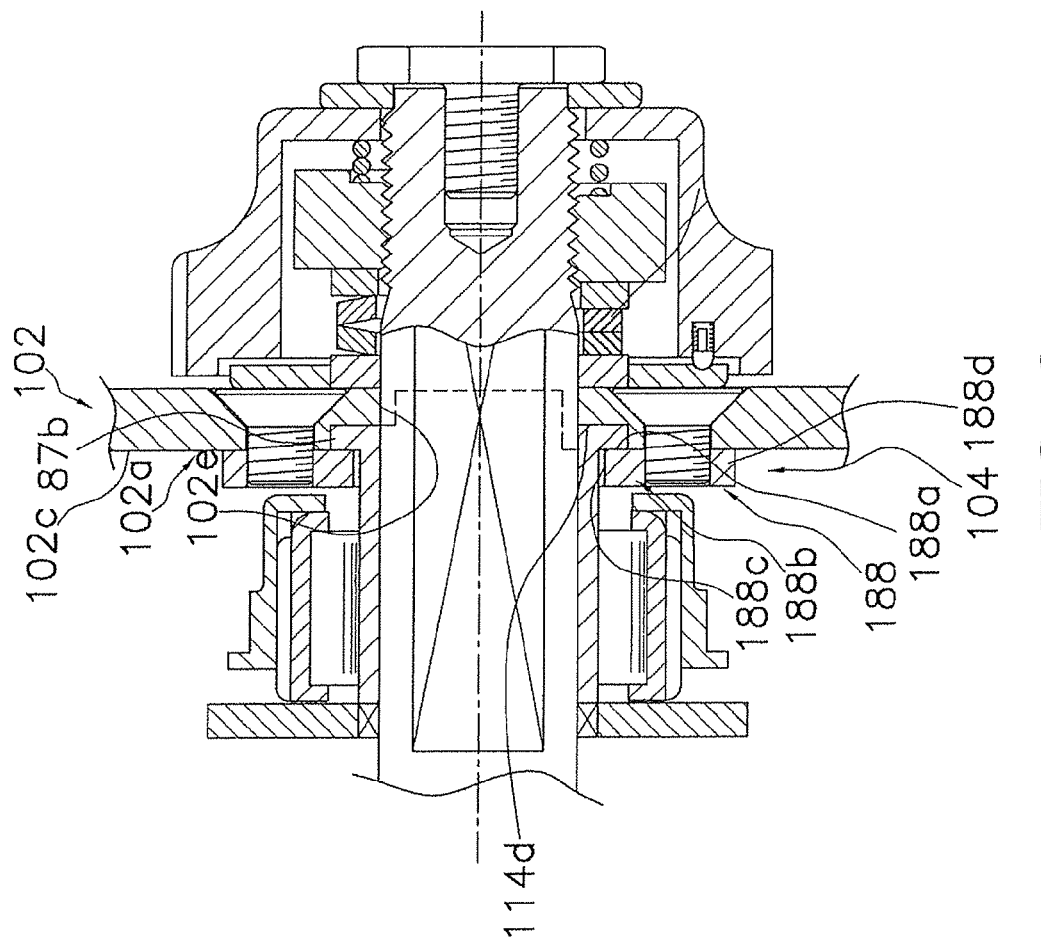
FIG. 6 is a diagram similar to FIG. 3 but according to a modification 1 of the first exemplary embodiment.

In a modification 1 of the first exemplary embodiment, a handle arm 102*a* of a handle 102 includes a protrusion accommodating portion 114*d* for accommodating the retainer protrusion 87*b* of the inner race 86*b*, as illustrated in FIG. 6. The protrusion accommodating portion 114*d* is circularly recessed on a first surface 102*c* of the handle arm 102*a* while surrounding a through hole 102*e*. In the modification 1, the retainer protrusion 87*b* is accommodated in the protrusion accommodating portion 114*d*. Therefore, a restricting portion 188*b* and a pair of fixed portions 188*d*, included in a restricting member 188 of a retainer section 104, are formed as a plate shaped member. Therefore, the entire end surface of the restricting portion 118*b*, faced to the handle arm 102*a*, functions as a retainer surface 188*a*. Further, the restricting portion 188*b* includes a through hole 188*c* as the inner peripheral surface thereof. The other structures are the same as those of the first exemplary embodiment. Therefore, explanation thereof will be hereinafter omitted.

When the inner race 86*b*, used in the modification 1 thus structure, has the same shape as that of the first exemplary embodiment, the handle arm 102*a* and the star drag 3 can be disposed closer to the reel unit 1 by the depth of the protrusion accommodating portion 114*d*. Further, the restricting member 188 is not required to accommodate the retainer protrusion 87*b*. Therefore, the restricting member 188 can be simply formed.

Modification 2 of First Exemplary Embodiment

Figure 7:
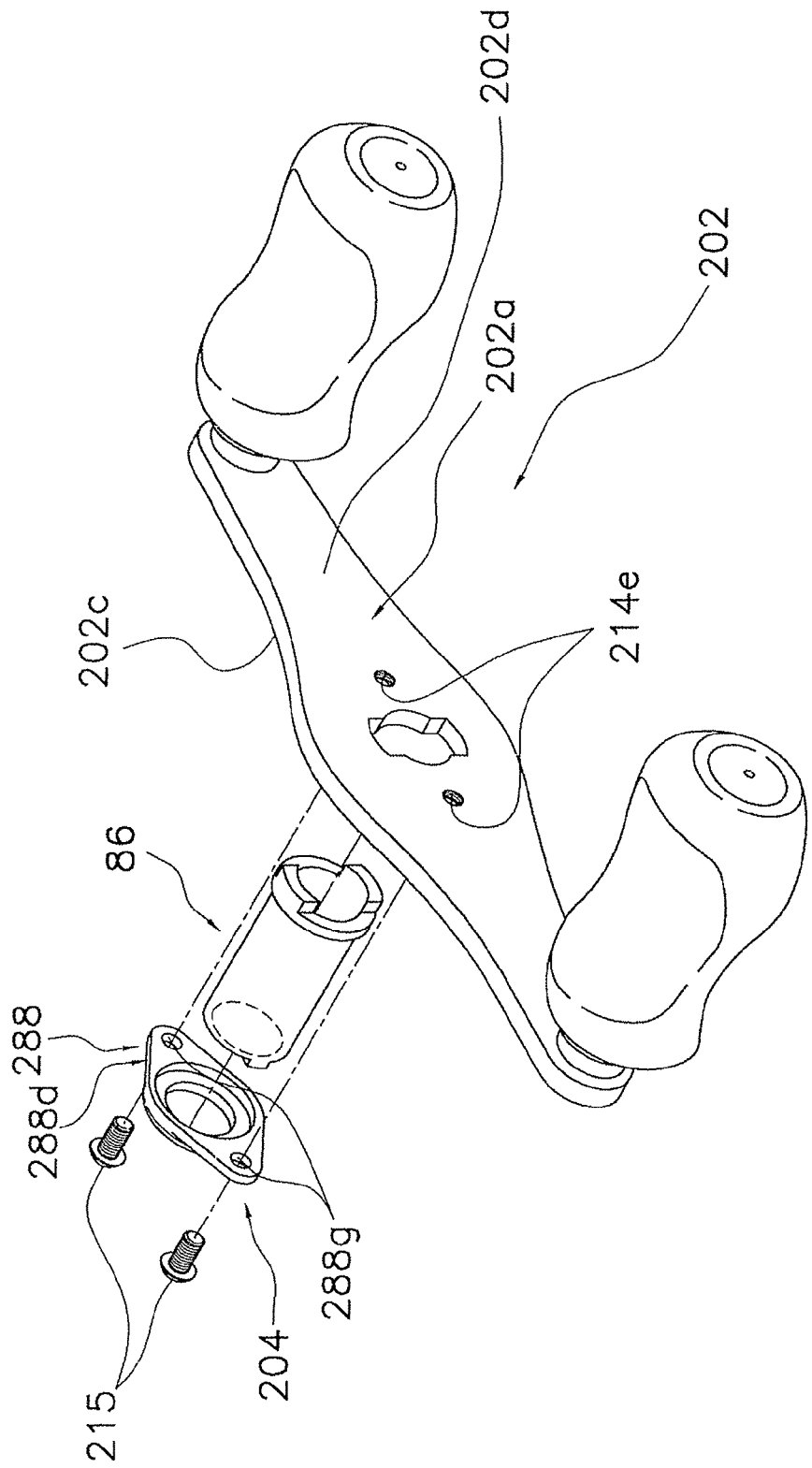
FIG. 7 is an exploded perspective view of a handle of a dual-bearing reel according to a modification 2 of the first exemplary embodiment.

In a modification 2 of the first exemplary embodiment, screw members 215 are inserted into corresponding components from a first surface 202*c* side of a handle arm 202*a*, as illustrated in FIG. 7. Therefore, a pair of fixed portions 288*d* of a restricting member 288 of a retainer section 204 includes screw penetrating apertures 288*g*, instead of female threaded portions, in the same positions as the female threaded portions 88*f* of the first exemplary embodiment. On the other hand, the handle arm 202*a* of the handle 202 includes female threaded portions 214*e* in the same positions as the screw penetrating apertures 14*b* of the first exemplary embodiment. The female threaded portions 214*e* allow the screw member 215 to be screwed therein. The other structures are the same as those of the first exemplary embodiment. Therefore, explanation thereof will be hereinafter omitted.

According to the modification 2 thus structured, the restricting member 288 is fixed to the handle arm 202*a* by the screw members 215 inserted therein from the first surface 202*c* side. Therefore, the heads of the screw members 215 are not exposed to a second surface 202*d* side.

Modification 3 of First Exemplary Embodiment

Figure 8:
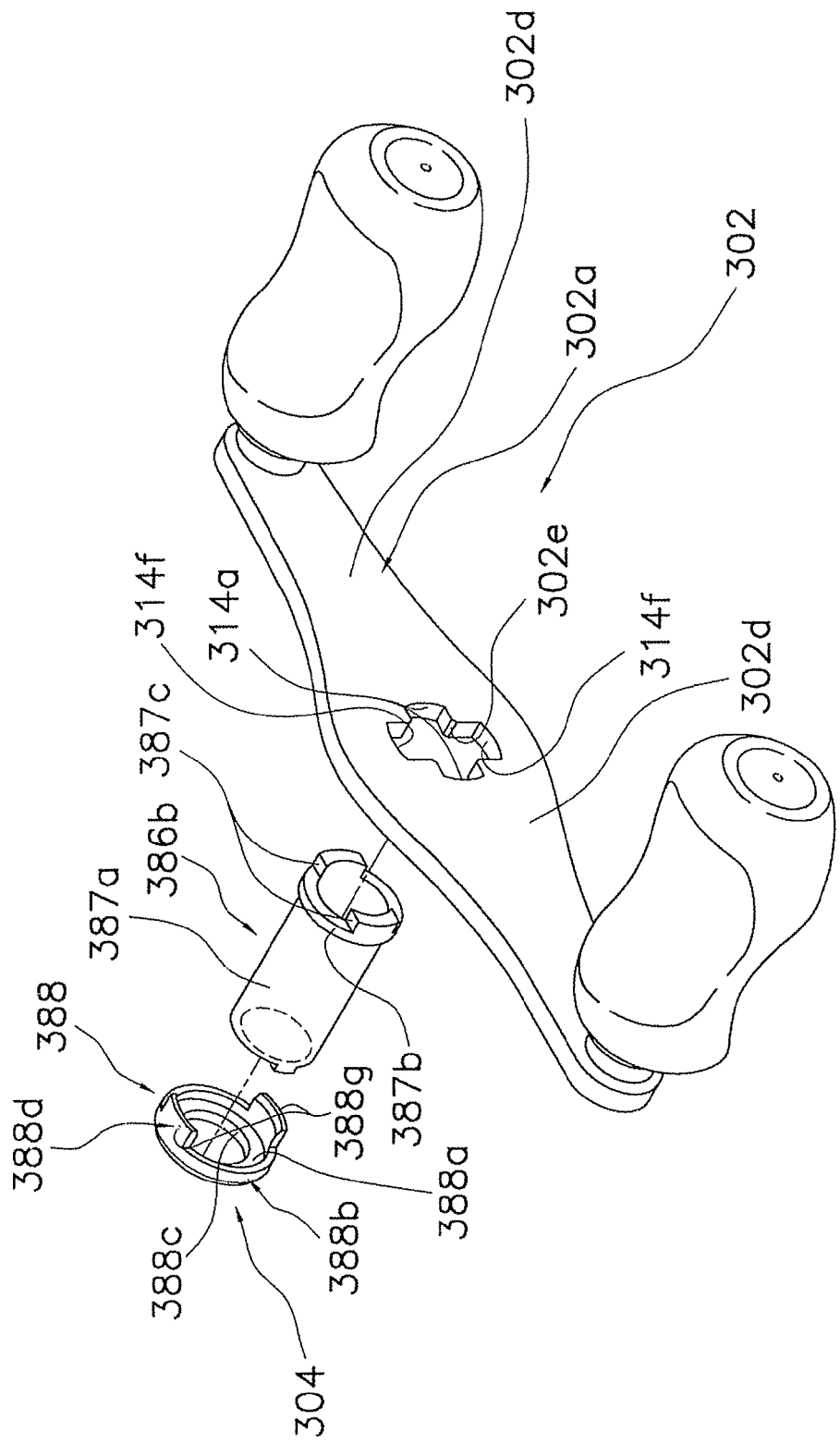
FIG. 8 is a diagram similar to FIG. 7 but according to a modification 3 of the first exemplary embodiment.

In a modification 3 of the first exemplary embodiment, a restricting member 388 of a retainer section 304 is deformed to a handle arm 302*a* of a handle 302 without using screw members, as illustrated in FIG. 8. Therefore, the handle arm 302*a* include a pair of fix recesses 314*f* disposed perpendicular to a pair of first engaged recesses 314*a* in a through hole 302*e*. Unlike the first exemplary embodiment, the first engaged recesses 314*a* are herein separated away from each other in the longitudinal direction of the handle arm 302*a* not in a perpendicular direction to the longitudinal direction of the handle arm 302*a*. In other words, the fix recesses 314*f* are disposed perpendicularly to the longitudinal direction of the handle arm 302*a*.

An inner race 386b includes a pair of first engaging protrusions 387c disposed perpendicularly to the first engaging protrusions 87c of the first exemplary embodiment.

For example, the restricting member 388 is made of aluminum alloy. The restricting member 388 includes a restricting portion 388b, a through hole 388c and a fixed portion 388d. The restricting portion 388b includes a retainer surface 388a making contact with a surface of a retainer protrusion 387b of the inner race 386b, i.e., a surface opposite to the axially outward end surface of the retainer protrusion 387b. The through hole 388c allows a tubular portion 387a of the inner race 386b to pass therethrough. The fixed portion 388d is fixed to the handle arm 302a.

The fixed portion 388d includes a pair of fix protrusions 388g to be deformed to the handle arm 302a. The fix protrusions 388g are protruding from the end surface of the restricting portion 388b towards the handle arm 302a. The inner peripheral part of each fix protrusion 388g is chamfered in a tapered shape for easily deforming each fix protrusion 388g towards the outer peripheral side in deforming. The protruding length of each fix protrusion 388g is slightly longer than the thickness of the handle arm 302a. Therefore, the tips of the fix protrusions 388g are protruding out of the second surface 302d of the handle arm 302a. The tips of the fix protrusions 388g are radial-outwardly pressed on the second surface 302d of the handle arm 302a by an arbitrary suitable deforming tool. The restricting member 388 is thus deformed to the handle arm 302a. Accordingly, the inner race 386b is coupled to the handle arm 302a in a unitarily rotatable state while being restricted from axially moving. The other structures are the same as those of the first exemplary embodiment. Therefore, explanation thereof will be hereinafter omitted.

According to the modification 3 thus structured, the restricting member 388 is made of easily deformable metal such as aluminum. Therefore, the restricting member 388 can be fixed to the handle arm 302a by deforming without using an additional member for fixation.

Second Exemplary Embodiment

General Reel Configuration of Second Exemplary Embodiment

Figure 9:
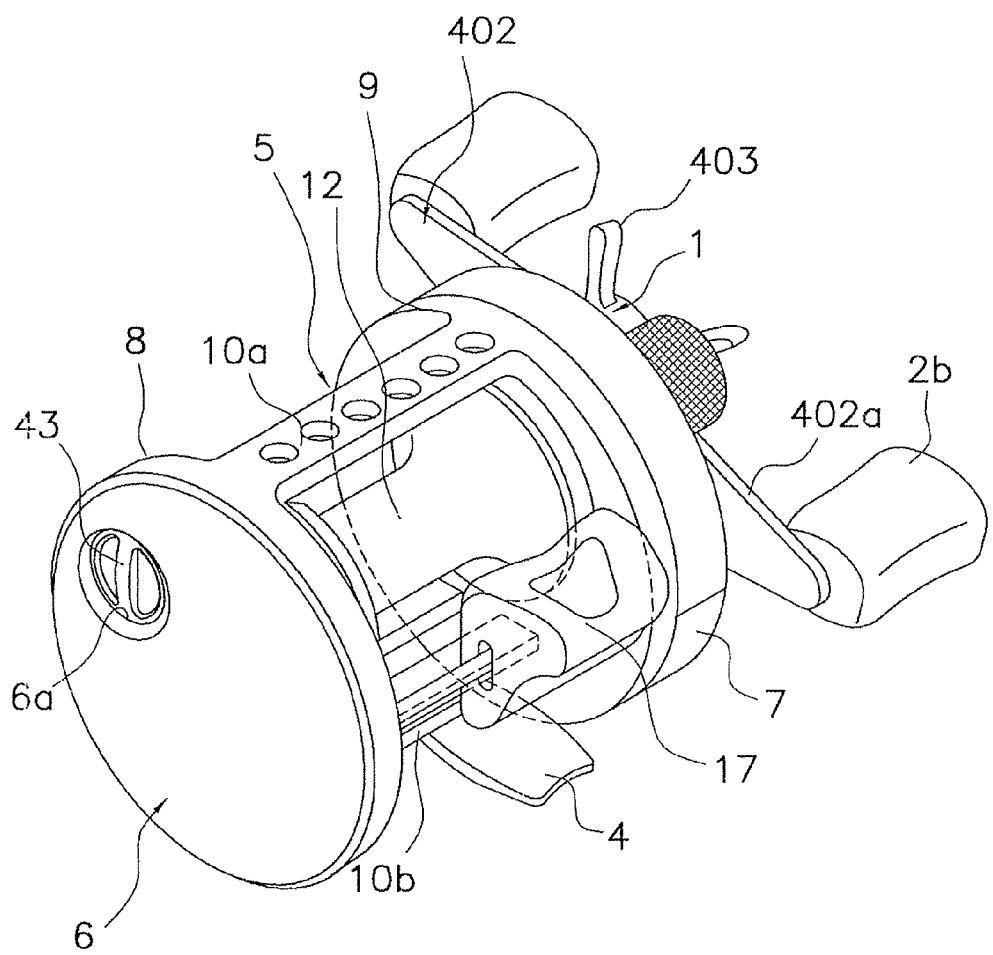
FIG. 9 is a perspective view of a dual-bearing reel according to a second exemplary embodiment of the present invention.
Figure 10:
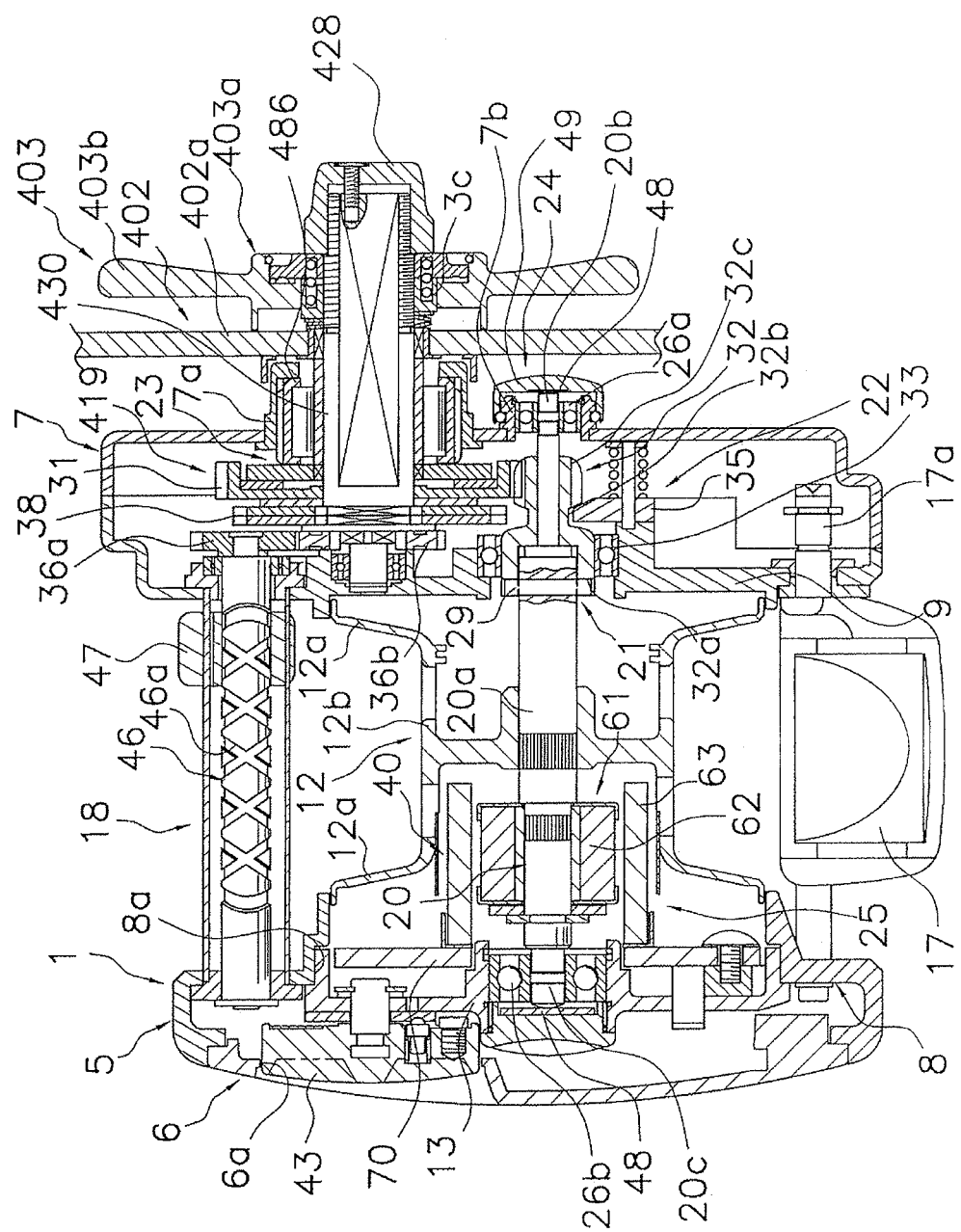
FIG. 10 is a horizontal cross-sectional view of the dual-bearing reel according to the second exemplary embodiment.

As illustrated in FIGS. 9 and 10, a dual-bearing reel according to a second exemplary embodiment of the present invention is a round dual-bearing reel for bait-casting. In the dual-bearing reel of the second exemplary embodiment, a handle 402, a star drag 403, a one-way clutch 486 and a rotation transmission mechanism 419 are only differently structured from the corresponding components in the dual-bearing reel of the first exemplary embodiment. Therefore, detailed explanation of the other components will be hereinafter omitted. In FIG. 9 and thereafter, a reference numeral, assigned to a component of the first exemplary embodiment, will be also assigned to a component of the second exemplary embodiment if these components are the same.

The dual-bearing reel includes the reel unit 1, the handle 402, the star drag 403 and the spool 12. The handle 402 is disposed lateral to the reel unit 1 for rotating the spool 12. The star drag 403 is a drag regulation member disposed on the opposite side of the reel unit 1 through the handle 402. The spool 12 is rotatably supported by the reel unit 1.

Handle Structure

The handle 402 is of a double-handle type including a plate-shaped handle arm 402a and the knobs 2b rotatably attached to the both longitudinal ends of the handle arm 402a. As illustrated in FIG. 10, the handle arm 402a is disposed on the outer peripheral side of a handle shaft 430 while being disposed closer to the reel unit 1. The handle shaft 430 is herein rotatably attached to the reel unit 1.

Figure 11:
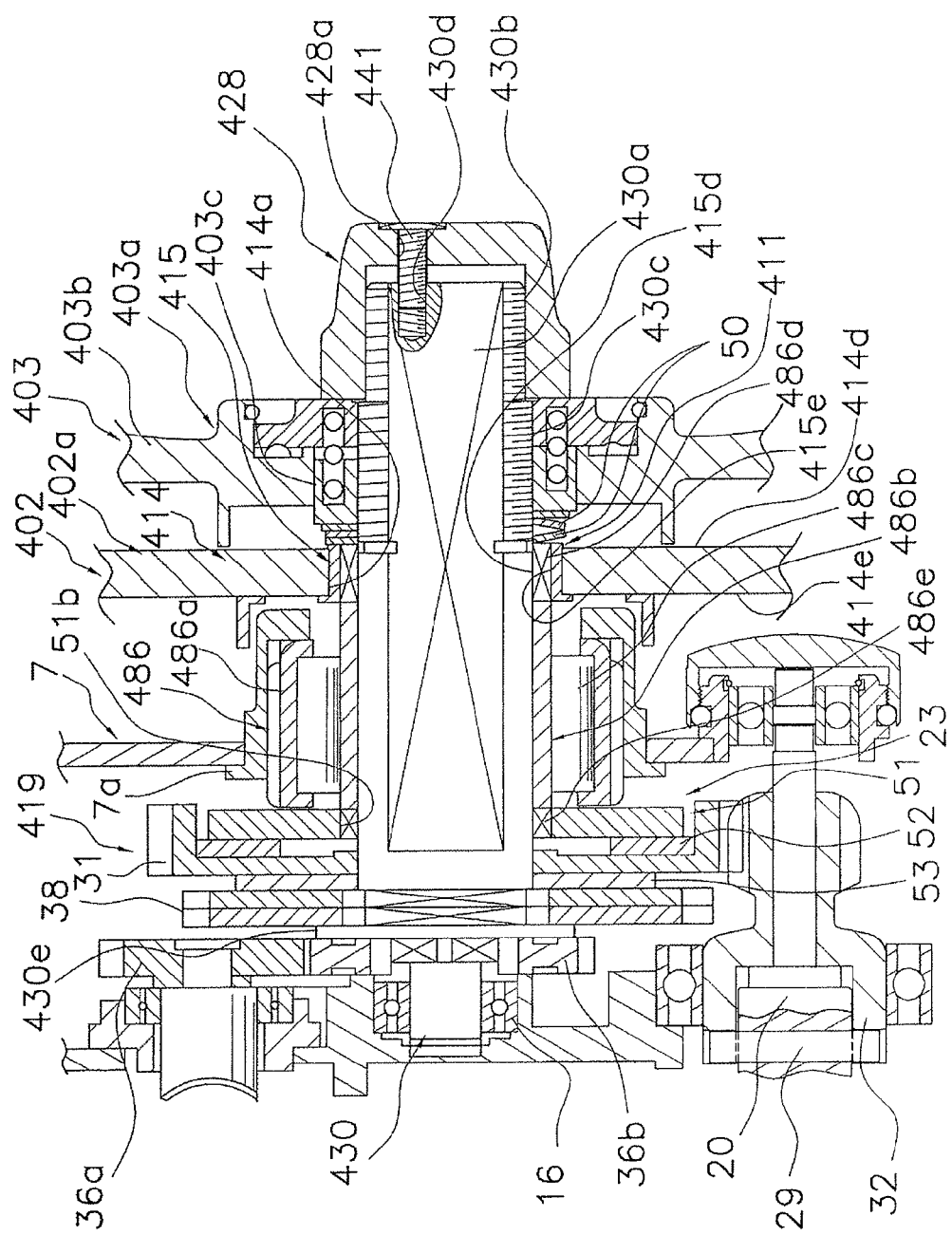
FIG. 11 is an enlarged cross-sectional view of a drag mechanism and its periphery of the dual-bearing reel illustrated in FIG. 10.
Figure 12:
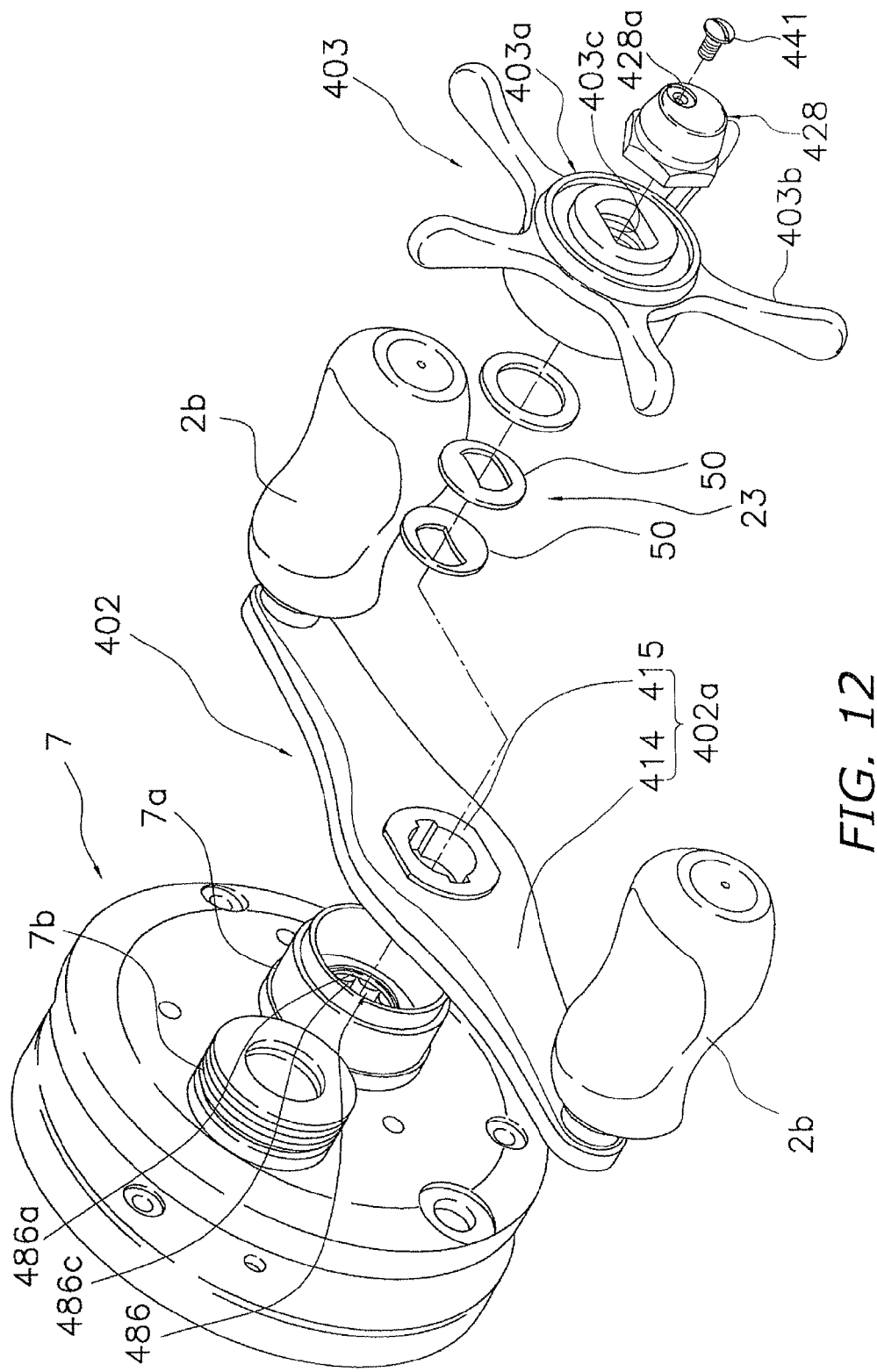
FIG. 12 is an exploded perspective view of the drag mechanism on a handle side according to the second exemplary embodiment.
Figure 14:
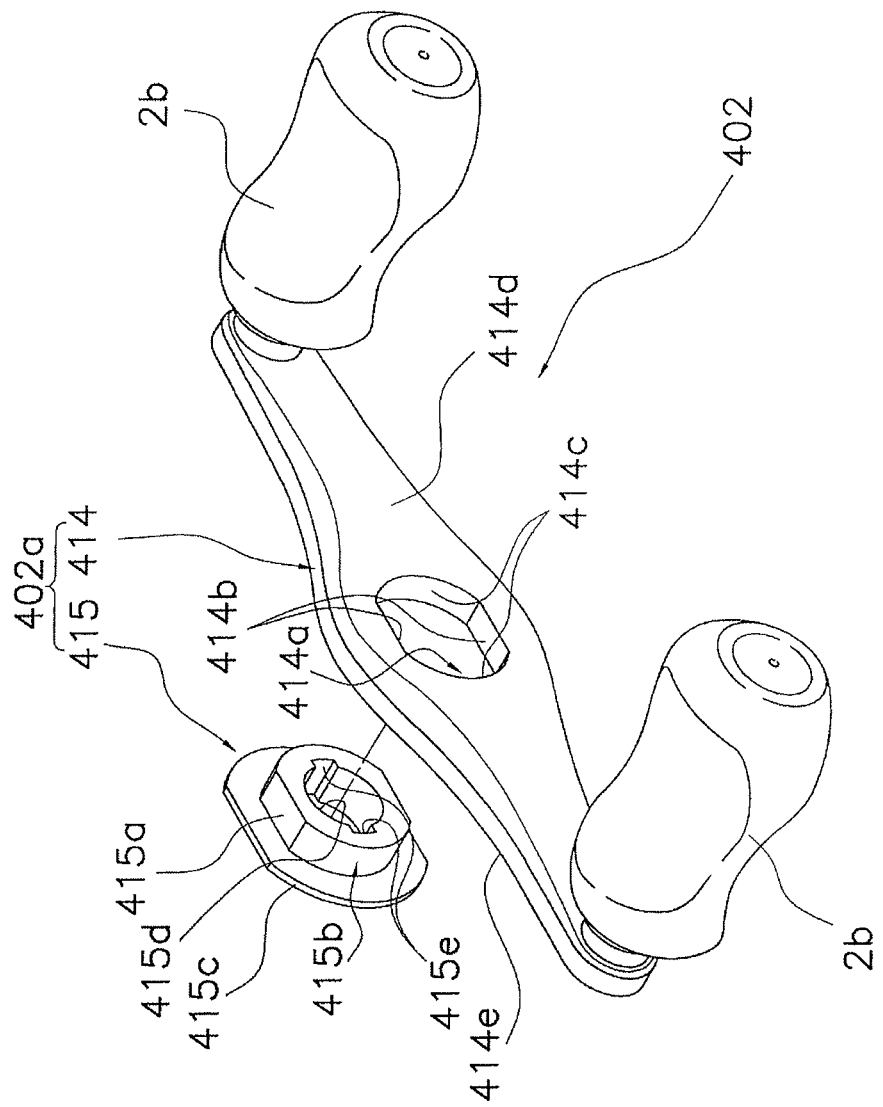
FIG. 14 is an exploded perspective view of a handle according to the second exemplary embodiment.

As illustrated in FIGS. 11, 12 and 14, the handle arm 402a includes a handle body 414 and an inserted member 415 fixed to the handle body 414. The handle body 414 is made of, for instance, light alloy (either aluminum alloy or magnesium alloy). In the present exemplary embodiment, the handle body 414 is made of aluminum alloy. As illustrated in FIG. 14, the handle body 414 includes a non-circular hole 414a on the center part thereof (i.e., a penetrating part allowing the handle shaft 430 to penetrate therethrough). The knobs 2 are rotatably supported by the both longitudinal ends of the handle body 414. As illustrated in FIG. 14, the non-circular hole 414a of the handle body 414 is a roughly oval hole formed by a pair of opposed straight portions 414b and a pair of circular arc portions 414c. One circular arc portion 414c connects one ends of the linear portions 414b while the other circular arc portion 414c connects the other ends of the linear portion 2 414b.

The inserted member 415 is made of, for instance, metal such as brass or zinc alloy. The inserted member 415 is disposed for preventing the handle body 414 and an inner race 486b of the one-way clutch 486 to be described from suffering from galvanic corrosion. The inserted member 415 includes a tubular portion 415b and a flanged portion 415c. The tubular portion 415b includes an outline portion 415a having a non-circular outline. The outline portion 415a is engaged with the non-circular hole 414a of the handle body 414 in a unitarily rotatable state. The flanged portion 415c has a diameter greater than that of the tubular portion 415b. The tubular portion 415b includes a through hole 415d and a pair of first engaged recesses 415e on the inner peripheral surface thereof. The through hole 415d is disposed onto the outer peripheral surface of the handle shaft 430 for allowing the tubular portion 415 to be rotatably supported thereon. The first engaged recesses 415e are coupled to the inner race 486b for allowing the tubular portion 415d to unitarily rotate therewith. The first engaged recesses 415e are formed on the diameter of the through hole 415d. The axial length of the tubular portion 415b is greater than the thickness of the handle body 414. Therefore, the tubular portion 415b is protruding from a first surface 414d (i.e., a surface disposed away from the reel unit 1) of the handle body 414. The protruding end of the tubular portion 415d is deformed by an arbitrary suitable deforming tool. Accordingly, the inserted member 415 is deformed and fixed to the handle body 414 in a unitarily rotatable state.

The flanged portion 415c is abutted to a second surface 414e (i.e., a surface disposed closer to the reel unit 1) of the handle body 414. The flanged portion 415c is allowed to press the inner race 486b while making contact with the end surface of the inner race 486b.

Reel Unit Structure

The reel unit 1 is a member made of metal such as aluminum alloy or magnesium alloy. The reel unit 1 includes the frame 5, the first side cover 6 and the second side cover 7. The first and second side covers 6 and 7 are attached to the both lateral sides of the frame 5. The spool 12 for winding a fishing line is rotatably attached to the inside of the reel unit 1 through the spool shaft 20 (see FIG. 2).

As illustrated in FIG. 10, the frame 5 accommodates the spool 12, the clutch lever 17 and the level winding mechanism 18. The clutch lever 17 functions as a thumb pad in thumbing the fishing line. The level winding mechanism 18 is configured to uniformly wind the fishing line onto the spool 12. Further as illustrated in FIGS. 10 and 11, the rotation transmission mechanism 419, the clutch mechanism 21, the clutch control mechanism 22, the drag mechanism 23 and the casting control mechanism 24 are disposed in the space between the frame 5 and the second side cover 7.

Rotation Transmission Mechanism Structure

The rotation transmission mechanism 419 includes the handle shaft 430, the drive gear 31, the pinion gear 32, the first gear member 36a and the second gear member 36b. The drive gear 31 is fixed onto the handle shaft 430. The pinion gear 32 is a tubular member meshed with the drive gear 31. The handle shaft 430 is rotatably attached to the second side plate 9 and the second side cover 7 through the bearing 16 and the one-way clutch 486, respectively.

The handle shaft 430 is prevented from rotating in the fishing-line releasing direction (i.e., prevented from reversely rotating) by the roller-type one-way clutch 486. The handle shaft 430 includes a rotational coupling portion 430a on the outer peripheral surface thereof. The rotational coupling portion 430a is coupled to the drag washer 51 to be described in a unitarily rotatable state. The rotational coupling portion 430a is formed by a pair of parallel flat surfaces formed on the outer peripheral surface of the handle shaft 430. The handle shaft 430 includes a first male threaded portion 430b on the tip thereof. A nut member 428 to be described is screwed onto the first male threaded portion 430b. The handle shaft 430 further includes a second male threaded portion 430c on the outer peripheral surface thereof. The second male threaded portion 430c is disposed adjacent to the first male threaded portion 430b, while being disposed closer to the base end of the handle shaft 430 than the first male threaded portion 430b is. A nut portion 403c of the star drag 403 to be described is screwed onto the second male threaded portion 430c. The second male threaded portion 430c has a diameter greater than that of the first male threaded portion 430b. Further, the handle shaft 430 includes a female threaded portion 430d on the axial end surface thereof. The female threaded portion 430d is displaced from the center on the axial end surface of the handle shaft 430.

One-way Clutch Structure

As illustrated in FIG. 11, the one-way clutch 486 is attached radially between the second side cover 7 and the handle shaft 430. The one-way clutch 486 includes an outer race 486a, the inner race 486b and rollers 486c. The outer race 486a is made of iron-related alloy including stainless alloy, such as SUS440C. The outer race 486a is attached onto the first boss 7a in a non-rotatable state. The first boss 7a is herein attached to the second side cover 7 while being protruding outwards. The inner race 486b is made of iron-related alloy including stainless alloy, such as SUS404C. The inner race 486b is rotatably attached to the handle shaft 430. The rollers 486c are made of iron-related alloy including stainless alloy, such as SUS440C. The rollers 486c, which forms a cylindrical roller unit, are disposed between the outer race 486a and the inner race 486b while being allowed to get stuck therebetween. Anti-corrosive performance is enhanced for the surfaces of these members by reformation.

Inner Race Structure

The inner race 486b is interposed between the handle 402 (specifically, the inserted member 415) and the drag washer 51 to be described of the drag mechanism 23 while making contact with both of the handle 402 and the drag washer 51. The inner race 486b includes a pair of first engaging protrusions 486d on a first end (i.e. a right end in FIG. 11) closer to the handle 402. The first engaging protrusions 486d are axially protruding and engaged with the first engaged recesses 415e. Further, the inner race 486b includes a pair of second engaging protrusions 486e on a second end (i.e., a left end in FIG. 11) opposite to the first end. The second engaging protrusions 486e are axially protruding and engaged with the drag washer 51 in a unitarily rotatable state. The drag washer 51 is engaged with the handle shaft 430 in a unitarily rotatable state. Therefore, the inner race 486b is coupled to the handle shaft 430 through the drag washer 51 in a unitarily rotatable state. In the present exemplary embodiment, the inner race 486b and the handle 402 are directly coupled in a unitarily rotatable state. In the present exemplary embodiment, however, the inner race 486b is not prevented from being detached from the handle 402. Alternatively, the first engaging protrusions 486d may be deformed to the first engaged recesses 415e, for instance, for preventing the inner race 486b from being detached form the handle arm 402a through the first engaging protrusions 486d and the first engaged recesses 415e. Thus, the retainer section 411 may be formed by the deforming structure.

Restricting Member Structure

The drive gear 31 is rotatably attached onto the handle shaft 430 while being frictionally connected to the handle shaft 430 through the drag mechanism 23.

The pinion gear 32 is a tubular member that the spool shaft 20 penetrates through the center part thereof. The pinion gear 32 is inwardly extended from the outside of the second side plate 9. The pinion gear 32 is attached onto the spool shaft 20 while being axially movable. Further, the left end (see FIG. 10) of the pinion gear 32 is supported by the second side plate 9 through the bearing 33 while being rotatable and axially movable. The pinion gear 32 includes the engaged groove 32a on the left end thereof (see FIG. 10). The engaged groove 32a is engaged with the engaging pin 29. The engaged groove 32a and the engaging pin 29 form the clutch mechanism 21. Further, the pinion gear 32 includes the narrowed portion 32b in the axial intermediate part thereof. Yet further, the pinion gear 32 includes the gear portion 32c on the axial right end thereof. The gear portion 32c is meshed with the drive gear 31.

Drag Mechanism Structure

As illustrated in FIG. 10, the drag mechanism 23 is configured to regulate drag force in response to an operating position of the star drag 403. The drag mechanism 23 is allowed to regulate and brake rotation of the spool 12 in the fishing-line releasing direction. The star drag 403 includes an operating part body 403a and the nut portion 403c. The operating part body 403a includes a plurality of radially extended operating arms 403b. The nut portion 403c is attached to the operating part body 403a while being unitarily rotatable therewith and axially movable. As described above, the nut portion 403c is screwed onto the second male threaded portion 430c. When the operating part body 403a is rotated, the nut portion 403c is movable in the axial direction of the handle shaft 430.

The star drag 403 is attached onto the tip of the handle shaft 430 while interposing the handle 402 together with the inner race 486b. The star drag 403 is prevented from being detached from the handle shaft 430 by the nut member 428 screwed onto the first male threaded portion 430b. Further, the nut member 428 prevents the handle 402 from being detached from the handle shaft 430 through the star drag 403. The nut member 428 includes a penetrating aperture 428a allowing an anti-rotation screw 441 to axially penetrate therethrough. The nut member 428 is prevented from rotating by the anti-rotation screw 441. The anti-rotation screw 441 is screwed into the female threaded portion 430d formed on the axial end surface of the handle shaft 430 while penetrating through the penetrating aperture 428a.

Figure 13:
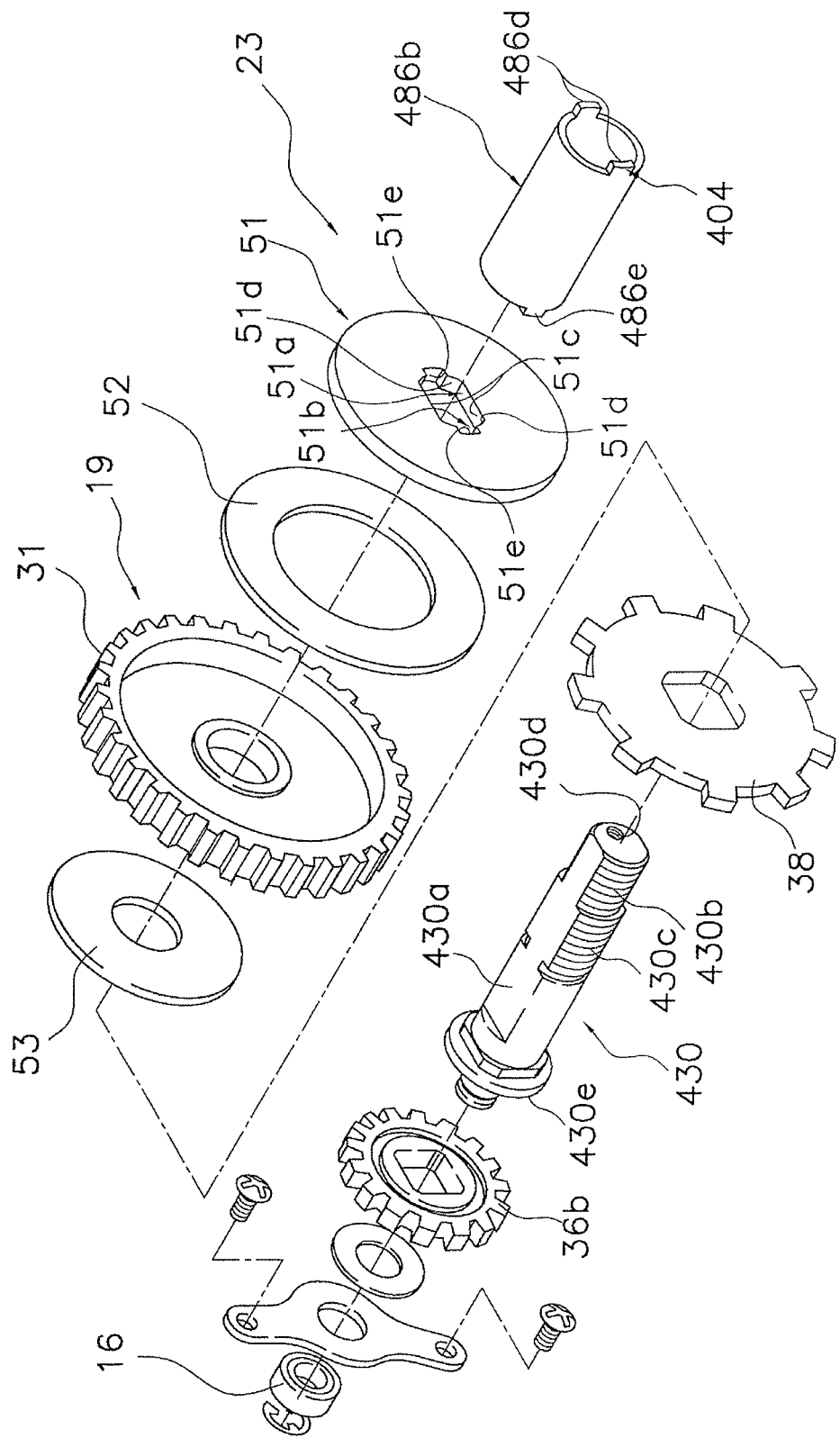
FIG. 13 is an exploded perspective view of the drag mechanism on a reel unit side according to the second exemplary embodiment.

The drag mechanism 23 is disposed about the handle shaft 430. As illustrated in FIGS. 11, 12 and 13, the drag mechanism 23 includes a single or plurality of (e.g., two) disc springs 50, the drag washer 51, the first drag disc 52 and the second drag disc 53. The disc springs 50 are pressed by the nut portion 403c of the star drag 403. The first and second drag discs 52 and 53 are disposed while interposing the drive gear 31 therebetween. The disc springs 50 are disposed between the star drag 403 and the handle 402. The drag springs 50 are configured to transmit spring force varying in conjunction with the axial movement of the star drag 403 to the drag washer 51 through the handle 402 and the inner race 486b. The drag washer 51 is coupled to the handle shaft 430 in a unitarily rotatable state.

The drag washer 51 is coupled to the handle shaft 430 and the inner race 486b in a unitarily rotatable state. As illustrated in FIG. 13, the drag washer 51 includes the first coupling portion 51a and the second coupling portion 51b. The first coupling portion 51a is coupled to the handle shaft 430 in a unitarily rotatable state, whereas the second coupling portion 51b is coupled to the inner race 486b in a unitarily rotatable state. More specifically, the drag washer 51 includes the first coupling portion 51a in the inner periphery thereof. The first coupling portion 51a includes a pair of the straight portions 51c and a pair of the connecting portions 51d. The straight portions 51c are disposed in parallel to each other. One connecting portion 51d connects one ends of the straight portions 51c, whereas the other connecting portion 51d connects the other ends of the straight portions 51c. The straight portions 51c are engaged with the surfaces of the rotation coupling portion 430a of the handle shaft 430 and rotation of the drag washer 51 is thereby transmitted to the handle shaft 430. The second coupling portion 51b includes a pair of the second engaged recesses 51e recessed on the connecting portions 51d. The second engaging portions 486e of the inner race 486b are engaged with the second engaged recesses 51e, and rotation of the inner race 486b is thereby transmitted to the drag washer 51. Further, rotation of the drag washer 51 is transmitted to the handle shaft 430. The handle shaft 430 is thus rotated by rotation of the handle 402. In the well-known structure, rotation of the handle has been configured to be directly transmitted to the handle shaft. In the second exemplary embodiment, by contrast, rotation of the handle 402 is directly transmitted to the inner race 486b and is further transmitted to the handle shaft 430 through the inner race 486b and the drag washer 51.

The first drag disc 52 makes contact with the drive gear 31 and the drag washer 51 while being interposed therebetween. The second drag disc 53 makes contact with the drive gear 31 and the ratchet wheel 38 while being interposed therebetween. The first and second drag discs 52 and 53 are rotatable with respect to the handle shaft 430. The ratchet wheel 38 also functions as the drag mechanism 23. The ratchet wheel 38 is disposed to make contact with a large-diameter flanged portion 430e formed on the outer peripheral surface of the handle shaft 430. The ratchet wheel 38 receives pressure of the star drag 403 through the flanged portion 430e.

Similarly to the first exemplary embodiment, rotation of the handle 402 is directly transmitted to the inner race 486b in the second exemplary embodiment thus structured. Therefore, looseness between the handle 402 and the inner race 486b is reduced. This prevents the handle 402 from easily rotating in the fishing-line releasing direction and prevents the handle 402 from easily wobbling.

Modification 1 of Second Exemplary Embodiment

In the second exemplary embodiment, the handle body 414 is made of iron-related alloy such as stainless alloy. In the present invention, however, the material of the handle body 41 is not limited to the above. It should be noted that a reference numeral, assigned to a component of the second exemplary embodiment, will be also assigned to a component of a modification 1 of the second exemplary embodiment if these components are the same. On the other hand, when a component of the modification 1 of the second exemplary embodiment has the same function as a corresponding component of the second exemplary embodiment but is made of material different from that of the corresponding component of the second exemplary embodiment, a reference numeral obtained by adding 100 to that of the corresponding component of the second exemplary embodiment will be given to the component of the modification 1 of the second exemplary embodiment.

Figure 15:
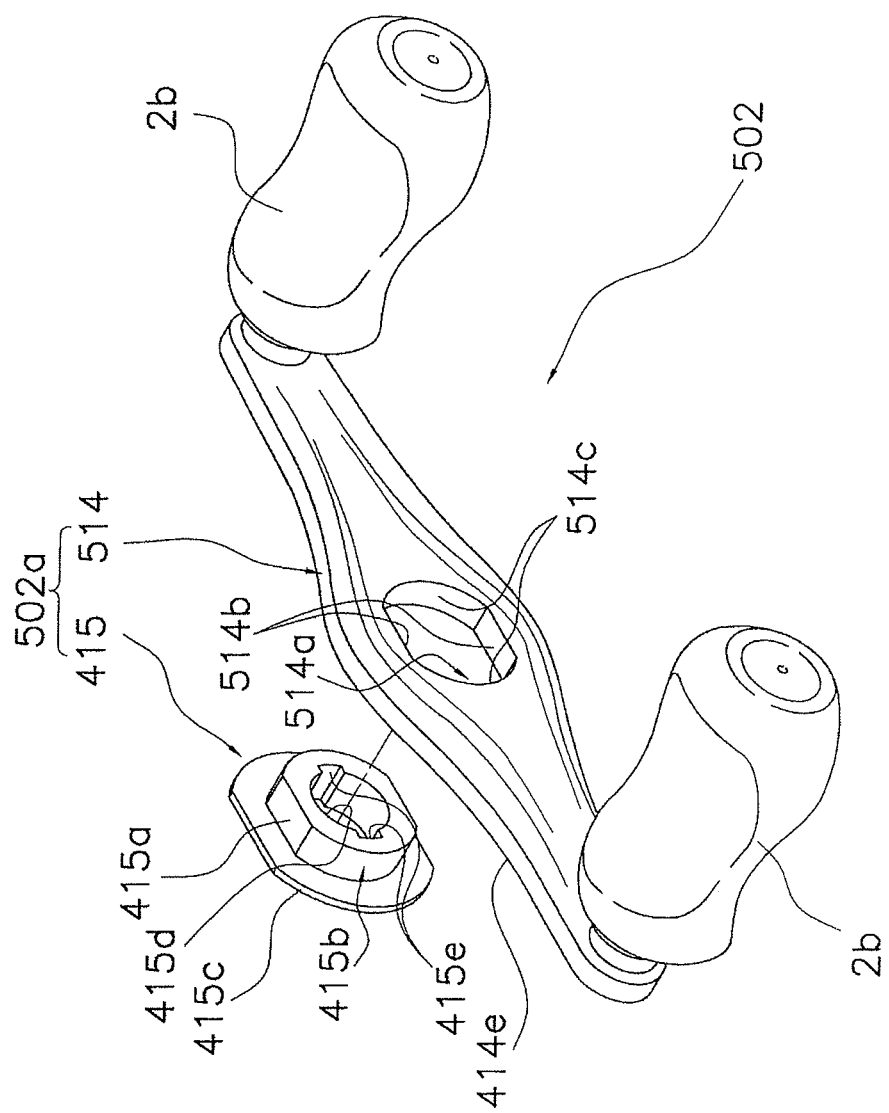
FIG. 15 is a diagram similar to FIG. 14 but according to a modification 1 of the second exemplary embodiment.

In FIG. 15, a handle body 514 of a handle arm 502a of a handle 502 is made of carbon fiber reinforced resin. In the modification 1 of the second exemplary embodiment, the longitudinal center part of the handle body 514 is axial-outwardly bulged compared to the peripheral part thereof for maintaining strength of the handle body 514 made of carbon fiber reinforced resin.

When the handle body 514 is sectioned along a perpendicular direction so its longitudinal direction, the center part of the handle body 514 is axial-outwardly protruding compared to the peripheral part thereof. Similarly to the second exemplary embodiment, the handle body 514 includes a non-circular hole 514a, straight portions 514b and circular arc portions 514c on the center part thereof.

The handle body 514, thus made of carbon fiber reinforced resin, is prevented from being easily cracked in deforming the inserted member 415 thereto.

Features

The aforementioned exemplary embodiment can be expressed as follows. When a component is mutually used in the first and second exemplary embodiments, the reference numeral of the component in the first exemplary embodiment will be used in the following explanation.

(A) The dual-bearing reel includes the reel unit 1, the handle shaft 30, the one-way clutch 86, the drag mechanism 23, the star drag 3, the handle 2, the spool 12 and the rotation transmission mechanism 19. The handle shaft 30 is rotatably supported by the reel unit 1. The one-way clutch 86 includes the outer race 86a, the inner race 86b and the rollers 86c. The outer race 86a is non-rotatably attached the reel unit 1. The inner race 86b is coupled to the handle shaft 30 in a unitarily rotatable state. The rollers 86c are disposed between the outer race 86a and the inner race 86b. The drag mechanism 23 includes the drag washer 51. The drag washer 51 is coupled to the handle shaft 30 in a unitarily rotatable state. The star drag 3 is a member attached to the handle shaft 30 for regulating drag force of the drag mechanism 23. The handle 2 is disposed between the star drag 3 and the reel unit 1. The handle arm 2a of the handle 2 includes the through hole 2e allowing the handle shaft 30 to penetrate therethrough. The handle 2 is coupled to the inner race 86 in a unitarily rotatable state while being disposed about the through hole 2e. The spool 12 is rotatably attached to the reel unit 1. The rotation transmission mechanism 19 is configured to transmit rotation of the handle 2 to the spool 12.

In the dual-bearing reel, the handle 2 and the inner race 86b of the one-way clutch 86 are coupled in a unitarily rotatable state while being disposed about the through hole 2e. When the handle 2 is rotated, rotation of the handle 2 is therefore transmitted to the inner race 86b of the one-way clutch 86 and is further transmitted from the inner race 86b to the handle shaft 30 through the drag washer 51. Rotation of the handle 2 is herein directly transmitted to the inner race 86*b* of the one-way clutch 86. Therefore, wobbling of the handle 2 can be inhibited.

Further, the star drag 3 is disposed axially outwards of the handle 2. Therefore, the axial length of the inner race 86*b* can be reduced. Yet further, the handle 2 is disposed closer to the spool 12. This can reduce moment about the fishing rod. Accordingly, the handle 2 can be smoothly rotated and this enhances fishing-line winding efficiency.

(B) In the dual-bearing reel, the inner race 86*b* includes the first engaging protrusions 87*c* axially protruding from the first end thereof disposed closer to the handle 2. The handle 2 includes the first engaged recesses 14*a* in the through hole 2*e* for allowing the first engaging protrusions 87*c* to be engaged therewith.

In this case, the handle 2 and the inner race 86*b* are unitarily rotated while the first engaging protrusions 87*c* formed on the inner race 86*b* are engaged with the first engaged recesses 14*a* formed in the through hole 2*e* of the handle 2. Therefore, the handle 2 and the inner race 86*b* can be unitarily rotated with a simple engaging structure.

(C) The dual-bearing reel further includes the retainer section 4 for prevented the inner race 86*b* from being detached from the handle 2. In this case, the inner race 86*b* is prevented from being detached from the handle 2. Therefore, axial movement of the inner race 86*b* is inhibited.

(D) In the dual-bearing reel, the handle arm 2*a* of the handle 2 includes the first surface 2*c* disposed closer to the reel unit 1 and the second surface 2*d* disposed away from the reel unit 1. The retainer section 4 includes the restricting member 88 fixed to the first surface 2*c* of the handle arm 2*a* for restricting movement of the inner race 86*b* in the axial direction of the handle shaft 30.

In this case, axial movement of the inner race 86*b* is restricted by the restricting member 88 fixed to the first surface 2*c* of the handle arm 2*a*. Therefore, axial movement of the inner race 86*b* is restricted by the restricting member 88 fixed to the first surface 2*c* of the handle arm 2*a* when rotation of the handle 2 is transmitted from the inner race 86*b* to the handle shaft 30. The inner race 86*b* and the handle 2 are herein coupled in a unitarily rotatable state, while the restricting member 88 fixed to the handle 2 restricts movement of the inner race 86*b* in the axial direction of the handle shaft 30. Therefore, wobbling of the handle 2 is inhibited while the handle 2 and the inner race 86*b* can be reliably coupled to each other.

(E) In the dual-bearing reel, the inner race 86*b* includes the tubular portion 87*a* and the retainer protrusion 87*b*. The tubular portion 87*a* is disposed on the outer peripheral side of the handle shaft 30. The retainer protrusion 87*b* is radially protruding from the outer peripheral surface of the tubular portion 87*a* on the first end side. The retainer protrusion 87*b* is retained by the restricting member 88.

In this case, the retainer protrusion 87*b* is engaged with the restricting member 88 fixed to the handle 2. Accordingly, axial movement of the inner race 86*b* can be restricted, and the handle 2 and the inner race 86*b* can be further reliably coupled to each other.

(F) In the dual-bearing reel, the retainer protrusion 87*b* is annularly formed on the outer peripheral surface of the tubular portion 87*a*. In this case, the inner race 86*b* can be uniformly retained by the restricting member 88 in the circumferential direction due to the annularly formed retainer protrusion 87*b*.

(G) In the dual-bearing reel, the handle arm 102*a* of the handle 102 includes the protrusion accommodating portion 114*d* formed on the first surface 102*c* thereof for accommodating the retainer protrusion 87*b*.

In this case, the retainer protrusion 87*b* is accommodated in the protrusion accommodating portion 114*d*. Therefore, the axial length of the handle 102 and its periphery can be reduced and the handle 102 can be disposed further closer to the reel unit 1. Further, the restricting member 188 is not required to accommodate the retainer protrusion 87*b*. Therefore, the restricting member 188 can be formed in a simple shape.

(H) In the dual-bearing reel, the restricting member 88 includes the retainer surface 88*a* making contact with the retainer protrusion 87*b*.

In this case, axial movement of the handle 2 and the inner race 86*b* can be restricted by the simple structure of the retainer protrusion 87*b* and the retainer surface 88*a*.

(I) In the dual-bearing reel, the restricting member 88 further includes the through hole 88*c* and the fixed portions 88*d*. The through hole 88*c* allows the tubular portion 87*a* of the inner race 86*b* to penetrate therethrough. The fixed portions 88*d* are disposed radial outwards of the retainer surface 88*a*. The fixed portions 88*d* are fixed to the handle arm 2*a* of the handle 2. The retainer surface 88*a* is formed radial outwards of the through hole 88*c*.

In this case, the inner race 86*b* is retained radial outwards of the through hole 88*c*, and the restricting member 88 is fixed to the handle arm 2*a* using the fixed portions 88*d* disposed radial outwards of the inner race 86*b*. Therefore, the fixing position and the retained position can be closer. Further, movement of the inner race 86*b* can be herein restricted.

(J) In the dual-bearing reel, a pair of the fixed portions 288*d* includes a plurality of the screw penetrating apertures 288*g* allowing a plurality of the screw members 215 for fixation to penetrate therethrough. The handle arm 202*a* of the handle 202 includes a plurality of the female threaded portions 214*e* for allowing the screw member 215 to be screwed therein. The screw members 215 are inserted into the screw penetrating apertures 288*g* and further the female threaded portions 214*e* from the first surface 202*c* side.

In this case, the restricting member 288 is fixed to the handle 202 by the screw members 215 inserted into the screw penetrating apertures 288*g* and further the female threaded portions 214*e* from the first surface 202*c* side. Therefore, the heads of the screw members 215 are not exposed to the outside of the second surface 202*d*.

(K) In the dual-bearing reel, the fixed portions 88*d* include a plurality of the female threaded portions 88*f* for allowing a plurality of the screw members 15 for fixation to be screwed therein. The handle arm 2*a* of the handle 2 includes a plurality of the screw penetrating apertures 14*b* allowing the screw members 15 to penetrate therethrough. The head accommodating portions 14*c* are formed on the second surface 2*d* of the handle arm 2*a* while being disposed in the surrounding of the respective screw penetrating apertures 14*b*. The head accommodating portions 14*c* can accommodate the head portions 15*a* of the screw members 15. The screw members 15 are inserted into the screw penetrating apertures 14*b* from the same side as the second surface 2*d* of the handle arm 2*a*.

In this case, the restricting member 88 is fixed to the handle 2 by the screw members 15 inserted into the screw penetrating apertures 14*b* from the second surface 2*d* side. Therefore, the head portions o 15*a* of the screw members 15 are exposed to the outside. However, the head portions 15*a* are herein accommodated in the head accommodating portions 14*c*. Therefore, the head portions 15*a* are not protruding from the second surface 2*d*. Further, the screw members 15 can be inserted into the screw penetrating apertures 14*b* from the same side as the second surface 2d positioned on the outer surface of the dual-bearing reel. Consequently, the inner race 86b and the handle 2 can be easily assembled.

(L) In the dual-bearing reel, the fixed portion 388d includes a pair of the fix protrusions 388g deformed to the handle arm 302a of the handle 302. The handle arm 302a of the handle 302 includes a pair of the fix recesses 314f for allowing the fix protrusions 388g to penetrate through the through hole 302e.

In this case, the restricting member 388 is made of easily deformable metal such as aluminum. Therefore, the restricting member 388 can be fixed to the handle arm 302a of the handle 302 by deforming without additionally using separate members for fixation.

(M) In the dual-bearing reel, the inner race 486b is prevented from being detached from the handle 402 by the retainer section 411, more specifically, by deforming the engaging protrusions 486d to the handle 402 through the first engaged recesses 415e.

In this case, the engaging protrusions 486d formed in the inner race 486b are deformed to the handle 402 through the first engaged recesses 415e. Accordingly, the inner race 486b can prevented from being detached from the handle 402 while being unitarily rotatable with the handle 402. Consequently, with a simple structure, the inner race 486b can prevented from being detached from the handle 402 while being unitarily rotatable with the handle 402.

(N) In the dual-bearing reel, the handle arm 402a of the handle 402 includes the handle body 414 and the inserted member 415. The handle body 414 includes the non-circular hole 414a formed in a part thereof for allowing the handle shaft 430 to penetrate therethrough. The inserted member 415 is unitarily rotatable with the handle body 414. The inserted member 415 includes the outline portion 415a to be engaged with the non-circular hole 414a. The inserted member 415 further includes the first engaged recesses 415e and the through hole 415d in the inner periphery thereof.

In this case, the handle 402 includes the handle body 414 and the inserted member 415 to be engaged with the inner race 486b. Therefore, the handle body 414 can be prevented from making contact with the inner race 486b through the inserted member 415. Even when the handle body 414 is made of material such as aluminum alloy or magnesium alloy, which is lightweight but easily suffered from galvanic corrosion, the handle body 414 can be prevented from galvanic corroding while being produced at a lightweight. It should be noted that the inserted member 415 can be fixed to the handle body 414 by, for instance, an arbitrary fixation method such as abrasion or deforming.

(O) In the dual-bearing reel, the inner race 486b is made of iron-related metal including stainless alloy. The handle body 414 is made of light alloy (either aluminum alloy or magnesium alloy). In this case, galvanic corrosion can be prevented due to contact between the handle body 414 and the inner race 486b.

(P) In the dual-bearing reel, the handle body 514 is made of carbon graphite. In this case, the handle body 514 can be produced at a lightweight. When the inserted member 415 is deformed to the handle body 514, the handle body 514 is herein prevented from being cracked due to deforming.

(Q) In the dual-bearing reel, the inner race 86b includes at least one second engaging protrusion 87d. The second engaging protrusion/protrusions 87d is/are axially protruding from the second end (opposite to the first end) of the tubular portion 87a. The second engaging protrusion/protrusions 87d is/are coupled to the drag washer 51 in a unitarily rotatable state.

In this case, the inner race 86b and the drag washer 51 can be coupled in a unitarily rotatable state by a simple engaging structure of convexo-concaves.

(R) The dual-bearing reel further includes the nut member 428 and the anti-rotation screw 441. The nut member 428 is screwed onto the tip of the handle shaft 430 for preventing the handle 402 from being detached from the handle shaft 430. The anti-rotation screw 441 is screwed into the female threaded portion 430d formed in the tip end of the handle shaft 430 while penetrating through the nut member 428.

In this case, the nut member 428 is prevented from rotating by directly screwing the anti-rotation screw 441 penetrating through the nut member 428 into the handle shaft 430. Therefore, the nut member 428 can be reliably prevented from rotating in a small space.

Other Exemplary Embodiments

Exemplary embodiments and modifications of the present invention have been explained above. However, the present invention is not limited to the aforementioned exemplary embodiments and modifications. A variety of changes can be herein made without departing from the scope of the present invention. Especially, the exemplary embodiments and the modifications described in the present specification can be arbitrarily combined as necessity.

(a) In the aforementioned exemplary embodiments, the dual-bearing reel of the double handle type including two knobs on the both axial ends of the handle arm has been exemplified as the dual-bearing reel of the present invention. In the present invention, however, the dual-bearing reel may not be limited to the above. For example, the dual-bearing reel may be of a single handle type that the handle arm includes an inner race engaged with the base end thereof in a unitarily rotatable state while including a knob disposed on the front end thereof.

(b) In the aforementioned exemplary embodiments and modifications, the retainer protrusion is annularly formed. In the present invention, however, the shape of the retainer protrusion may not be limited to the above. For example, at least one retainer protrusion may be protruding from the outer peripheral surface of the inner race. In this case, it is preferable to provide a plurality of retainer protrusions for enhancing rotational balance and retaining effect.

(c) In the aforementioned exemplary embodiments and modifications, the inner race 86b is coupled to the drag washer 51 in a unitarily rotatable state while being coupled to the handle shaft 30 through the drag washer 51 in a unitarily rotatable state. In the present invention, however, the coupling structure of the inner race may not be limited to the above. For example, the inner race may be directly coupled to the handle shaft in a unitarily rotatable state without being coupled to the drag washer.

(d) In the aforementioned exemplary embodiments and modifications, a pair of (i.e., two) the first engaging protrusions 87c and a pair of (i.e., two) the first engaged recesses 14a are provided. However, it is herein required to provide at least one first engaging protrusion 87c and at least one first engaged recess 14a. Further, the number of the first engaged recesses may be less than that of the first engaging protrusions.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel, comprising:
a reel unit;
a handle shaft rotatably supported by the reel unit;
a one-way clutch including
an outer race being attached to the reel unit, the outer race being not rotatable to the reel unit,
an inner race unitarily and rotatably coupled to the handle shaft, and
rollers disposed between the outer race and the inner race;
a drag mechanism including a drag washer unitarily and rotatably coupled to the handle shaft;
a drag regulation member attached to the handle shaft to regulate drag force of the drag mechanism;
a handle disposed between the drag regulation member and the reel unit, the handle including a through hole, the handle shaft penetrating in the through hole, the handle being unitarily and rotatably coupled to the inner race around the through hole;
a spool rotatably attached to the reel unit; and
a rotation transmission mechanism configured to transmit rotation of the handle to the spool.

2. The dual-bearing reel according to claim 1, wherein
the inner race includes a first engaging protrusion axial outwardly protruding from a first end thereof towards the handle,
the handle includes a first engaged recess in the through hole, and
the first engaging protrusion is engaged with the first engaged recess.

3. The dual-bearing reel according to claim 2, further comprising
a retainer section configured to prevent the inner race from being detached from the handle.

4. The dual-bearing reel according to claim 3, wherein
the handle includes a first surface disposed closer to the reel unit than to a handle knob and a second surface opposite to the first surface, and
the retainer section includes a restricting member fixed to the first surface of the handle to restrict movement of the inner race in an axial direction of the handle shaft.

5. The dual-bearing reel according to claim 4, wherein
the inner race includes a tubular portion disposed on an outer peripheral side of the handle shaft, and a retainer protrusion radially protruding from an outer peripheral surface of a first-end side part of the tubular portion, and
the restricting member is configured to retain the retainer protrusion.

6. The dual-bearing reel according to claim 5, wherein
the retainer protrusion is annularly formed on the outer peripheral surface of the tubular portion.

7. The dual-bearing reel according to claim 5, wherein
the handle includes a protrusion accommodating portion on the first surface for accommodating the retainer protrusion.

8. The dual-bearing reel according to claim 5, wherein
the restricting member includes a retainer surface making contact with the retainer protrusion.

9. The dual-bearing reel according to claim 8, wherein
the restricting member further includes a through hole to which the tubular member penetrates, and a fixed portion fixed to the handle and disposed radially outwards of the retainer surface, and
the retainer surface is formed radially outwards of the through hole.

10. The dual-bearing reel according to claim 9, wherein
the fixed portion includes a plurality of screw penetrating apertures to which a plurality of screw members penetrate,
the handle includes a plurality of female threaded portions in which the screw members are screwed,
the screw members are inserted and screwed into the female threaded portions of the handle from a side of the first surface.

11. The dual-bearing reel according to claim 9, wherein
the fixed portion includes a plurality of female threaded portions in which a plurality of screw members are screwed,
the handle includes a plurality of screw penetrating apertures to which the screw members penetrate,
the handle includes a plurality of head accommodating portions on the second surface around the screw penetrating apertures for accommodating the head portions of the screw members, and
the screw members are inserted into the screw penetrating apertures of the handle from a side of the second surface.

12. The dual-bearing reel according to claim 9, wherein
the retainer section includes a fix protrusion disposed on the fixed portion,
the fix protrusion is fixed to the handle by deforming, and
the handle includes a fix recess in the through hole in which the fix protrusion penetrates.

13. The dual-bearing reel according to claim 3, wherein
the retainer section is configured to prevent the inner race from being detached from the handle by fixing the first engaging protrusion to the first engaged recess of the handle by deforming.

14. The dual-bearing reel according to claim 13, wherein
the handle includes
a handle body having a non-circular hole formed in the handle shaft penetrating part of the handle, and
an inserted member having an outline portion to be engaged with the non-circular hole,
the inserted member includes the first engaged recess and the through hole in an inner periphery thereof, and
the inserted member configured to rotate unitarily with the handle body.

15. The dual-bearing reel according to claim 14, wherein
the inner race is made of iron alloy including stainless alloy, and
the handle body is a light alloy member made of either aluminum alloy or magnesium alloy.

16. The dual-bearing reel according to claim 15, wherein
the handle body is made of carbon graphite.

17. The dual-bearing reel according to claim 2, wherein
the inner race includes at least a second engaging protrusion axially protruding from a second end opposite to the first end, and
the second engaging protrusion is unitarily and rotatably coupled to the drag washer.

18. The dual-bearing reel according to claim 1, further comprising
a nut member screwed configured on a tip of the handle shaft to prevent the handle from being detached from the handle shaft, and
an anti-rotation screw penetrating through the nut member, the anti-rotation screw screwed into a female threaded portion formed on an axial end surface of the handle shaft.

\* \* \* \* \*